(12) United States Patent
Moon

(10) Patent No.: US 12,538,599 B2
(45) Date of Patent: Jan. 27, 2026

(54) IMAGE SENSORS AND CAMERA MODULES INCLUDING THE SAME

(71) Applicant: Samsung Electronics Co., Ltd., Suwon-si (KR)

(72) Inventor: Kyounghwan Moon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 855 days.

(21) Appl. No.: 17/672,074

(22) Filed: Feb. 15, 2022

(65) Prior Publication Data

US 2022/0293653 A1    Sep. 15, 2022

(30) Foreign Application Priority Data

Mar. 10, 2021  (KR) .................. 10-2021-0031465

(51) Int. Cl.
*H10F 39/00* (2025.01)

(52) U.S. Cl.
CPC ..... *H10F 39/8053* (2025.01); *H10F 39/8023* (2025.01); *H10F 39/8063* (2025.01); *H10F 39/807* (2025.01)

(58) Field of Classification Search
CPC ......... H01L 27/14621; H01L 27/14605; H01L 27/14627; H01L 27/1463; H04N 25/745; H04N 25/75; H04N 25/772; H04N 25/11
See application file for complete search history.

(56) References Cited

U.S. PATENT DOCUMENTS

| 8,451,352 | B2 * | 5/2013 | Hayasaka | G02B 27/0075 348/277 |
| 9,204,020 | B2 * | 12/2015 | Kawai | H04N 25/133 |
| 9,748,295 | B2 * | 8/2017 | Lee | H01L 27/14647 |
| 10,218,944 | B2 * | 2/2019 | Johnson | H04N 25/10 |
| 10,547,800 | B2 * | 1/2020 | Hwang | H04N 25/77 |
| 2007/0014019 | A1 * | 1/2007 | Mouli | H04N 23/12 348/E9.003 |
| 2014/0354861 | A1 * | 12/2014 | Pang | H04N 25/133 348/242 |
| 2015/0097213 | A1 * | 4/2015 | Chen | H01L 27/14656 438/60 |
| 2016/0035770 | A1 * | 2/2016 | Ahn | H01L 27/14645 257/432 |

(Continued)

FOREIGN PATENT DOCUMENTS

JP    2020191564 A    * 11/2020    ........... G02B 3/0056

*Primary Examiner* — Marlon T Fletcher
*Assistant Examiner* — Samuel Jonathan Smith
(74) *Attorney, Agent, or Firm* — HARNESS, DICKEY & PIERCE, P.L.C.

(57) ABSTRACT

An image sensor includes a pixel array, a color filter array including a plurality of color filters arranged in a matrix on the pixel array, and a micro lens array arranged on the color filter array. The plurality of color filters are divided into a plurality of groups that each include nine color filters arranged in three rows and three columns. A plurality of first color filters among the nine color filters included in each group of the plurality of groups face one another in a diagonal direction, and a plurality of second color filters among the nine color filters included in each group of the plurality of groups respectively include identical color filters corresponding to a corresponding group of the plurality of groups.

20 Claims, 14 Drawing Sheets

(56) References Cited

U.S. PATENT DOCUMENTS

| | | | |
|---|---|---|---|
| 2016/0088265 A1* | 3/2016 | Lu ........................ | H04N 25/135 |
| | | | 348/280 |
| 2020/0280659 A1* | 9/2020 | Galor Gluskin ....... | H04N 23/55 |
| 2021/0105423 A1* | 4/2021 | Miyakoshi ........... | H04N 25/583 |
| 2021/0126033 A1* | 4/2021 | Yang ..................... | H04N 25/11 |

* cited by examiner

IMAGE SENSORS AND CAMERA MODULES INCLUDING THE SAME

CROSS-REFERENCE TO RELATED APPLICATION

This application is based on and claims priority under 35 U.S.C. § 119 to Korean Patent Application No. 10-2021-0031465, filed on Mar. 10, 2021, in the Korean Intellectual Property Office, the disclosure of which is incorporated by reference herein in its entirety.

BACKGROUND

The inventive concepts relate to image sensors and camera modules including the same, and more particularly, to color filter arrays of image sensors and a layout structure of micro lens arrays.

An image sensor includes a color filter array (CFA), and detects color information from the passage of light having a specific wavelength band through the CFA. A Bayer filter is a color filter array including rows in which red filters and green filters are repeated, and rows in which green filters and blue filters are repeated. Recently, a color filter array has been introduced, which includes rows where red filters and green filters are repeated and rows where green filters and white filters are repeated, by including, in the color filter array, white filters through which light of any wavelength band passes.

SUMMARY

The inventive concepts provide image sensors that are configured to provide low-illumination quality based on a pixel layout structure and provide a phase detection signal pair for high-speed top-surface phase difference autofocusing.

According to some example embodiments of the inventive concepts, an image sensor may include a pixel array, a color filter array including a plurality of color filters arranged in a matrix on the pixel array, the plurality of color filters being divided into a plurality of groups that each include nine color filters arranged in three rows and three columns, and a micro lens array on the color filter array, in which a plurality of first color filters among the nine color filters included in each group of the plurality of groups face each other in a diagonal direction, and a plurality of second color filters among the nine color filters included in each group of the plurality of groups respectively include identical color filters corresponding to a corresponding group of the plurality of groups.

According to some example embodiments of the inventive concepts, an image sensor may include a pixel array, a color filter array including a plurality of color filters arranged in a matrix on the pixel array, the plurality of color filters being divided into a plurality of groups including a plurality of first color filters and a plurality of second color filters that each include nine color filters arranged in three rows and three columns, and a micro lens array on the color filter array, in which the micro lens array includes a first micro lens on four adjacent first color filters among the plurality of color filters and second micro lenses that are each on a different second color filter of the plurality of second color filters among the plurality of color filters.

According to another aspect of the inventive concepts, a camera device may include an image sensor, wherein the image sensor includes a pixel array further including a plurality of pixels arranged in a matrix, wherein the plurality of pixels are divided into a plurality of groups that each include a plurality of first pixels and a plurality of second pixels, wherein each group of the plurality of groups includes nine color filters arranged in three rows and three columns, wherein the image sensor further includes white filters on four adjacent first pixels among the plurality of pixels, and identical color filters corresponding to a corresponding group of the plurality of groups respectively on the plurality of second pixels among the plurality of pixels.

BRIEF DESCRIPTION OF THE DRAWINGS

Embodiments of the inventive concepts will be more clearly understood from the following detailed description taken in conjunction with the accompanying drawings in which.

DETAILED DESCRIPTION

Figure 1:
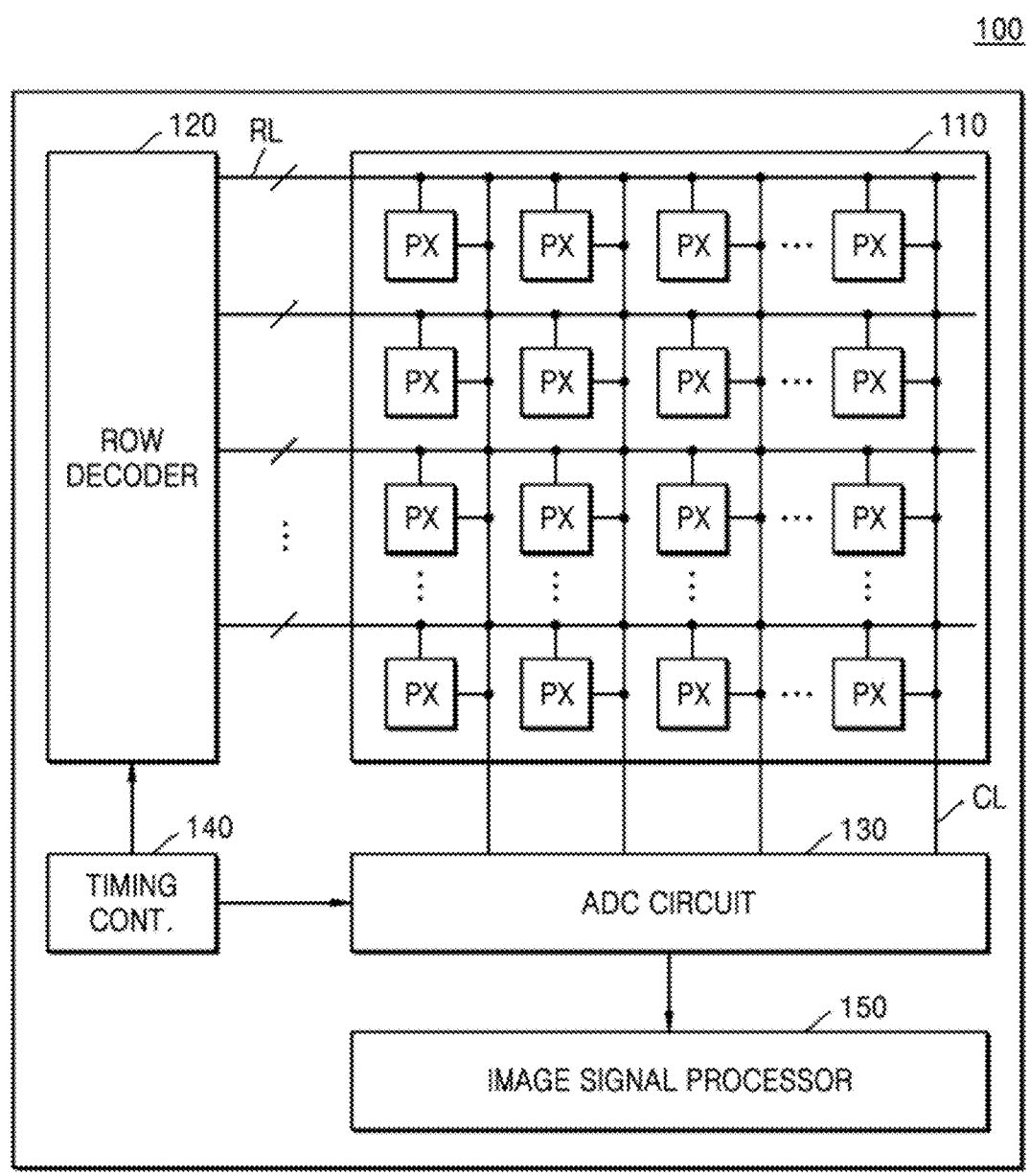
FIG. 1 is a block diagram schematically showing an image sensor, according to some example embodiments of the inventive concepts.

Hereinafter, some example embodiments of the inventive concepts will be described with reference to the accompanying drawings.

It will be understood that when an element such as a layer, film, region, or substrate is referred to as being "on" another element, it may be directly on the other element or intervening elements may also be present. In contrast, when an element is referred to as being "directly on" another element, there are no intervening elements present. It will further be understood that when an element is referred to as being "on" another element, it may be above or beneath or adjacent (e.g., horizontally adjacent) to the other element.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%)).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

FIG. 1 is a block diagram schematically showing an image sensor, according to some example embodiments of the inventive concepts.

Referring to FIG. 1, an image sensor 100 may include a pixel array 110, a row decoder 120, an analog-to-digital conversion circuit (hereinafter, an ADC circuit) 130, a timing controller 140, and an image signal processor 150.

The pixel array 110 may include a plurality of row lines RL, a plurality of column lines CL, and a plurality of pixels PX that are connected to the plurality of row lines RL and the plurality of column lines CL and are arranged in a matrix. In some example embodiments of the inventive concepts, the pixel array 110 may be implemented as a complementary metal oxide semiconductor image sensor (CIS). An optical signal passing through an optical lens may arrive at a light-receiving surface of the pixel array 110 and form an image of a subject. The pixel array 110 may sense light received using a photoelectric conversion element and output a pixel signal that is an electrical signal corresponding to the sensed light. For example, the photoelectric conversion element may be implemented as a photo diode, a photo transistor, a photo gate, a pinned photo diode, etc.

The image sensor 100 may further include a color filter array (not shown) and a micro lens array (not shown). The color filter array and the micro lens array may be sequentially stacked on the pixel array 110. The image sensor 100 may receive an optical signal collected through the micro lens array and transmit the optical signal of the particular wavelength band through the color filter array to the pixel array 110, thus detecting the color information.

The row decoder 120 may generate a plurality of control signals capable of controlling the operation of the pixels PX arranged in each row, under control of the timing controller 140. The row decoder 120 may provide the plurality of control signals to the plurality of pixels PX through the plurality of row lines RL. The pixel array 110 may be driven in the unit of a row in response to the plurality of control signals provided from the row decoder 120. Thus, the plurality of pixels PX of the pixel array 110 may sequentially output pixel signals in the unit of a row. In this case, a pixel signal may include a reset signal indicating a reset level and an image signal generated from a photoelectric conversion element.

The ADC circuit 130 may analog-to-digital convert each of a plurality of sensing signals received through the plurality of column lines CL. The ADC circuit 130 may include an analog-to-digital converter corresponding to each of the plurality of column lines CL, and convert a sensing signal received through a corresponding column line CL into a pixel value. According to an operation mode of the image sensor 100 (e.g., an operation mode in which the image sensor 100 is operating), the pixel value may indicate the amount of light sensed in each pixel or the amount of light sensed in a plurality of pixels included in a pixel group.

The timing controller 140 may generate timing control signals that control operations of the row decoder 120 and the ADC circuit 130. The row decoder 120 may drive the pixel array 110 in the unit of a row based on timing control signals received from the timing controller 140. The ADC circuit 130 may convert a plurality of sensing signals received through the plurality of column lines CL into a pixel value based on the timing control signals.

The image signal processor 150 may receive non-processed image data from the ADC circuit 130 and perform image signal processing. For example, the image signal processor 150 may perform signal processing such as black level compensation, lens shading compensation, cross-talk compensation, bad pixel correction, etc. Although it is illustrated in FIG. 1 that the image signal processor 150 is included in the image sensor 100, the image signal processor 150 may be included in a processor outside the image sensor 100.

In some example embodiments of the inventive concepts, the image sensor 100 may be mounted on an electronic device having an image- or light-sensing function, and may be mounted on an electronic device having an autofocusing function. For example, the image sensor 100 may be mounted on an electronic device such as a camera, a smartphone, a wearable device, the Internet of things (IoT), a tablet personal computer (PC), a personal digital assistant (PDA), a portable multimedia player (PMP), a navigation device, etc. The image sensor 100 may be mounted on an electronic device provided as a part of a vehicle, furniture, a producing facility, a door, various measurement devices, etc.

Figure 2:
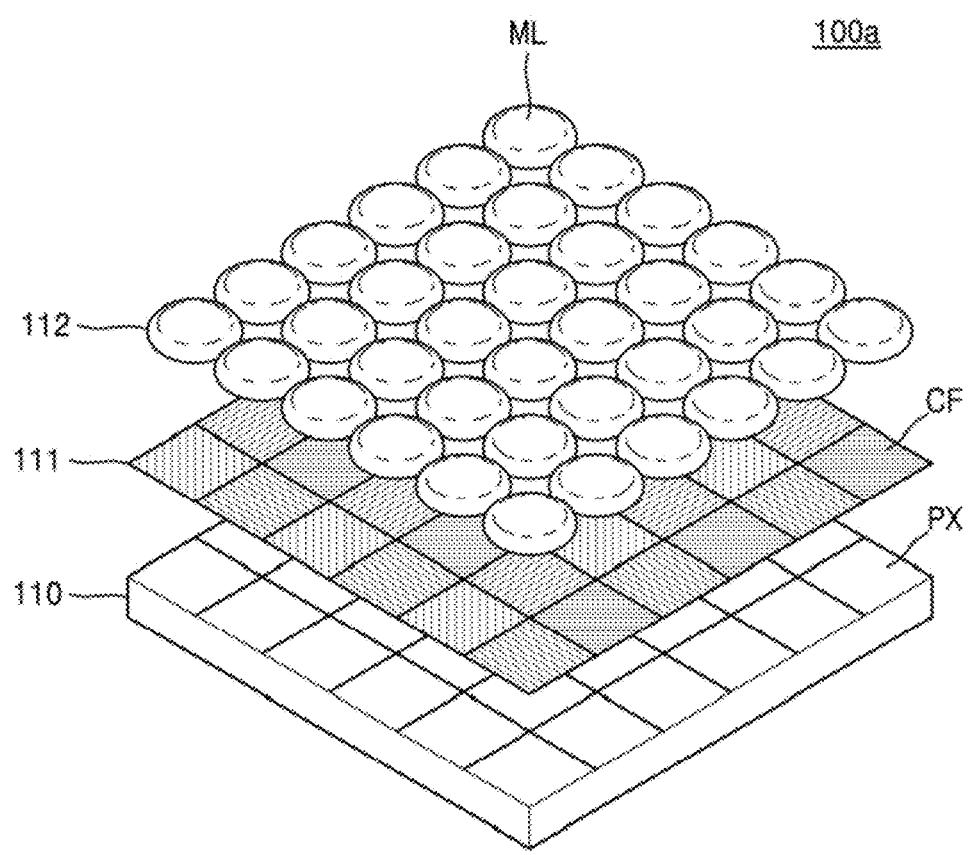
FIG. 2 is a block diagram showing an image sensor, according to some example embodiments of the inventive concepts.

FIG. 2 is a block diagram showing an image sensor, according to some example embodiments of the inventive concepts.

Referring to FIG. 2, an image sensor 100a may include the pixel array 110, a color filter array 111, and a micro lens array 112. The color filter array 111 and the micro lens array 112 may be sequentially stacked on the pixel array 110.

The pixel array 110 may include the plurality of pixels PX arranged in a matrix. Adjacent pixels among the plurality of pixels PX may form a pixel group. For example, the plurality of pixels PX may be divided into a plurality of pixel groups that each include nine adjacent pixels arranged in three rows and three columns. According to an operation mode of an image sensor, an image signal generated from a plurality of adjacent pixels PX may be output as a pixel value, and the sensitivity of the image signal may be improved in a low-light environment, thus improving quality. As will be described with reference to FIG. 8, the pixel array 110 may be designed to include a plurality of isolation films (e.g., deep trench isolation (DTI)) so as to reduce interference between a plurality of adjacent pixels.

The color filter array 111 may include a plurality of color filters CF arranged in a matrix on the pixel array 110. When the plurality of pixels PX included in the pixel array 110 are divided into a plurality of pixel groups, the plurality of color filters CF included in the color filter array 111 may be divided into a group corresponding to a pixel group. For example, the plurality of color filters CF may be divided into a plurality of groups that each include nine color filters arranged in three rows and three columns.

The color filter array 111 may be configured to transmit, or selectively transmit, light of a particular wavelength band corresponding to each of the plurality of color filters CF, out of light incident through the micro lens array 112. The transmitted light may be incident to the pixel array 110. For example, the plurality of color filters CF may include a red filter, a green filter, and a blue filter. The red filter may transmit (e.g., selectively transmit) light of the same wavelength band as a red region in a visible-light region. The green filter may transmit (e.g., selectively transmit) light of the same wavelength band as that of a green region in a visible-light region. For example, the green filter may include a green-on-red filter or a green-on-blue filter. The blue filter may transmit (e.g., selectively transmit) light of the same wavelength band as that of a blue region in the visible-light region. However, without being limited thereto, for example, the plurality of color filters CF may include a cyan filter, a yellow filter, a magenta filter, etc.

The color filter array 111 may further include a white filter. For example, the white filter may be denoted as a transparent filter, a clear filter, etc. The red filter, the green filter, and the blue filter (hereinafter, an RGB color filter) may transmit (e.g., selectively transmit) light of a particular wavelength band therethrough, and the white filter may transmit (e.g., selectively transmit) light of all wavelength bands therethrough. A pixel in which the white filter is arranged may have a higher sensitivity than a pixel in which the RGB color filter is arranged, thus improving low-illumination quality.

The micro lens array 112 is on the color filter array 111, such that the color filter array 111 is between the micro lens array 112 and the pixel array 110, and the micro lens array 112 may collect the optical signal passing through the optical lens to the center of each of the plurality of pixels PX. The micro lens array 112 may include a plurality of micro lenses ML. The micro lens array 112 may have a structure where the plurality of micro lenses ML are respectively arranged on (e.g., in the Z-axis direction) the plurality of color filters CF (e.g., the micro lenses ML are each on a different one or more color filters CF of the plurality of color filters CF in the Z-axis direction). Alternatively, the micro lens array 112 may have a structure where one micro lens is arranged on the plurality of color filters CF as a structure for top surface-phase difference detection.

Figure 3:
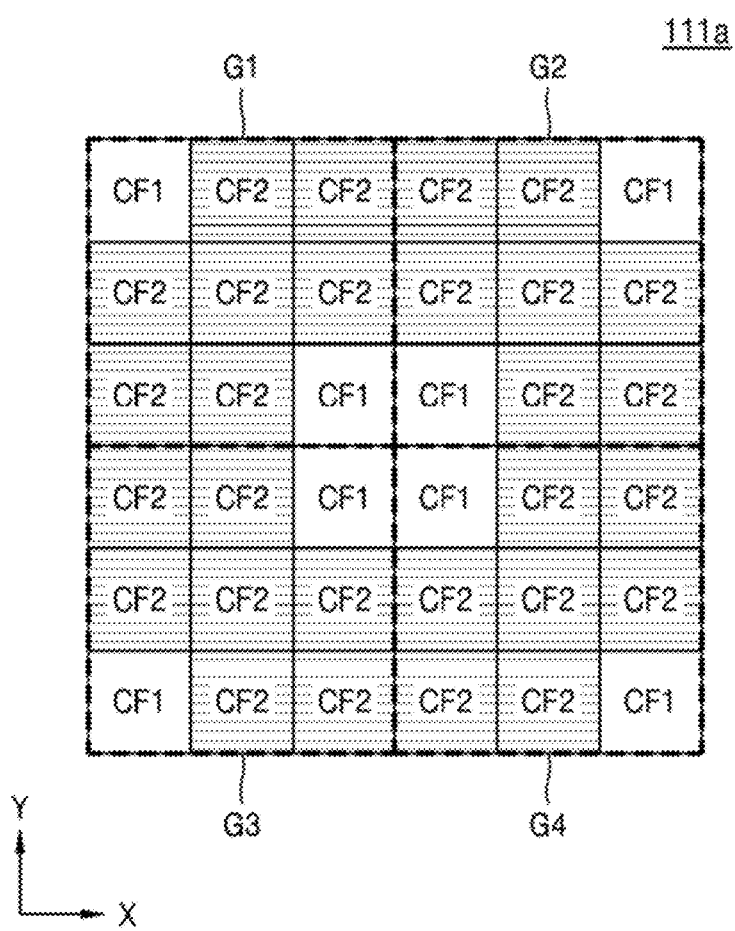
FIG. 3 is a block diagram showing a layout of a color filter array, according to some example embodiments of the inventive concepts.

FIG. 3 is a block diagram showing a layout of a color filter array, according to some example embodiments of the inventive concepts.

Referring to FIG. 3, a plurality of color filters included in a color filter array 111a may be divided into a plurality of groups G1 through G4, where the first group G1 and the second group G2 are adjacent to each other in a row direction (e.g., X-axis direction), the third group G3 is adjacent to the first group G1 in a column direction (e.g., Y-axis direction), and the fourth group G4 is adjacent to the second group G2 in the column direction. Each of the plurality of groups G1 through G4 may include nine color filters CF1 and CF2 arranged in three rows and three columns. The nine color filters CF1 and CF2 may include two first color filters CF1 and seven second color filters CF2. As shown in at least FIG. 3, the two first color filters CF1 may be positioned to face each other in a diagonal direction. Each of the seven second color filters CF2 may include identical color filters corresponding to a corresponding group of the plurality of groups. Herein, the diagonal direction indicates a direction between an X-axis direction and a Y-axis direction and which may extend in a same plane as the X-axis and Y-axis directions. The diagonal direction may further or alternatively indicate a direction that is diagonal to and/or different from both of the directions in which the three rows and three columns in which the nine color filters CF1 and CF2 are arranged and extending in a same plane as said directions.

Each of the two first color filters CF1 among the nine color filters may include a white filter W, and the seven second color filters CF2 among the nine color filters may include identical color filters through which light of a particular wavelength band corresponding to a group passes. Accordingly, each first color filter CF1 of the plurality of first color filters among the nine color filters in each group G1 to G4 may be configured to selectively transmit light of a first wavelength band (e.g., white light), and each second color filter CF2 of the plurality of second color filters among the nine color filters in each group G1 to G4 may be configured to selectively transmit light of a second wavelength band that is different from the first wavelength band (e.g., red, green, blue, magenta, cyan, yellow, etc.). Each second color filter CF2 may be a color filter that is different from a white filter W (e.g., is not a white filter W). For example, the seven second color filters CF2 included in each group may include seven red filters R, seven green filters GR and Gb, seven blue filters B, etc. Accordingly, four first color filters CF1 may be on four adjacent pixels of a plurality of pixels PX of the pixel array 110; such pixels PX may be referred to as first pixels PX of the pixel array 110. Additionally, as shown in FIG. 4, identical second color filters CF2 corresponding to a corresponding group G1 to G4 (e.g., red, green, or blue filters depending upon which group G1 to G4 the second color filters CF2 are located in) may be respectively arranged on a separate plurality of pixels PX, such pixels PX may be referred to as second pixels PX of the pixel array 110.

Figure 4:
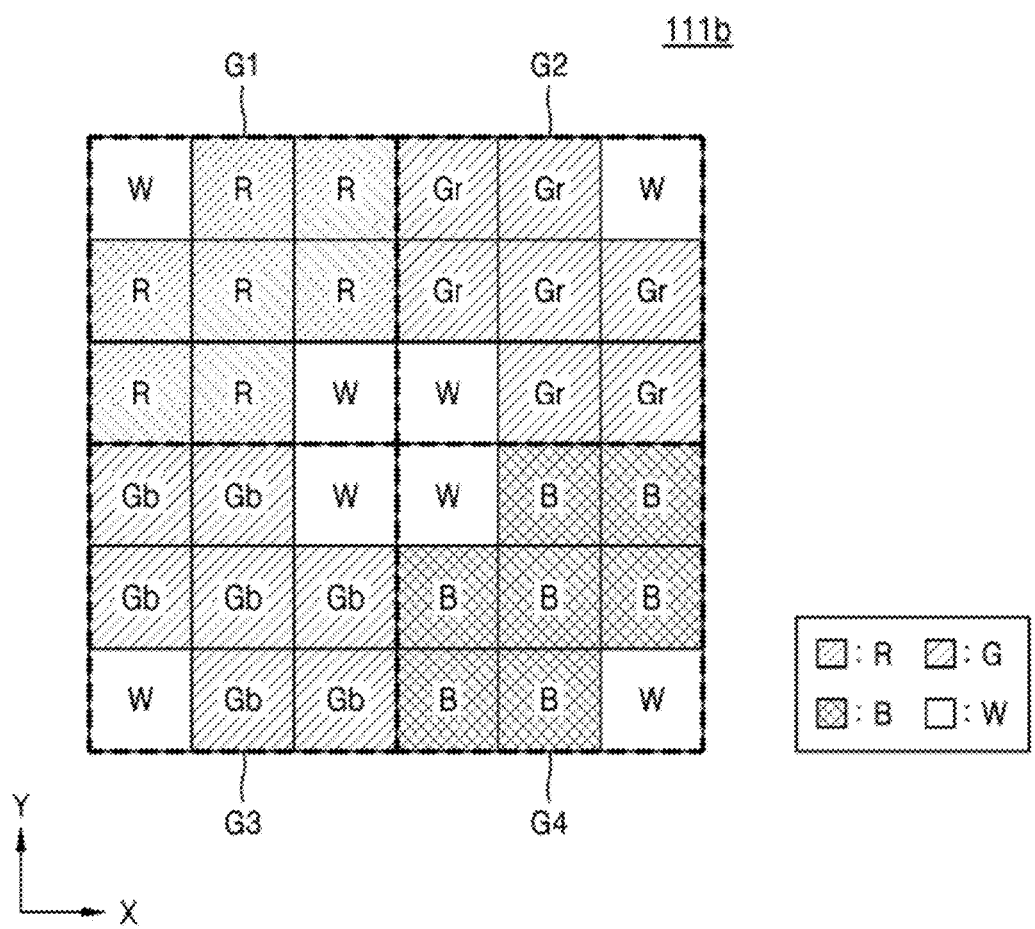
FIG. 4 is a block diagram showing a layout of a color filter array, according to some example embodiments of the inventive concepts.

As shown in at least FIGS. 3-4, any one of the two first color filters CF1 included in each of the plurality of groups G1 through G4 may be arranged adjacent to any one of first color filters CF1 included in a group adjacent in a row direction (e.g., a row-adjacent group), and at the same time, adjacent to any one of first color filters included in a group adjacent in a column direction (e.g., a column-adjacent group). For example, the first color filter CF1 included in the first group G1 may be arranged adjacent to the first color filter CF1 included in the second group G2 adjacent in the row direction and at the same time, adjacent to the first color filter CF1 included in the third group G3 adjacent in the column direction. Thus, the four first color filters CF1 may be arranged adjacent to one another. As will be described later with reference to FIG. 5, one micro lens may be arranged on the four adjacent first color filters CF1.

Although it is shown in FIG. 3 that a plurality of color filters are divided into four groups G1 through G4, without being limited thereto, a plurality of groups that each include nine color filters arranged in three rows and three columns, may be repeated to form the color filter array 111a.

FIG. 4 is a block diagram showing an example of a layout of a color filter array, according to some example embodiments of the inventive concepts. Hereinbelow, FIG. 4 will be described with reference to FIG. 3.

Referring to FIG. 4, each of first color filters CF1 among a plurality of color filters may correspond to a white filter W, and each of second color filters CF2 among the plurality of color filters may correspond to a color filter based on a particular pattern.

In some example embodiments of the inventive concepts, a configuration of the second color filters CF2 among the plurality of color filters may follow a Bayer filter. The Bayer filter may include rows in which red filters and green filters are repeated, and rows in which green filters and blue filters are repeated. For example, the first group G1 and the second group G2 may be adjacent to each other in a first row direction in a color filter array 111b. Based on a Bayer filter, each of the seven second color filters CF2 of the first group G1 may be a red filter R and each of the seven second color filters CF2 of the second group G2 may be a green filter Gr (e.g., first green filter). The third group G3 may be adjacent to the first group G1 in the column direction, and the fourth group G4 may be adjacent to the second group G2 in the column direction. Each of the seven second color filters CF2 of the third group G3 may be a green filter Gb (e.g., second green filter) and each of the seven second color filters CF2 of the fourth group G4 may be a blue filter B. Although it is shown in FIG. 4 that the second color filters CF2 among the plurality of color filters are configured based on Bayer filters, the second color filters CF2 may vary based on various patterns without being limited thereto.

As described with reference to FIG. 2, the white filter may transmit light of all wavelengths, such that a pixel in which the white filter is arranged may indicate a higher sensitivity than that of an RGB pixel in which an RGB color filter is arranged. Thus, an image sensor to which a color filter array including a white filter is applied may have a problem of saturation of an image signal or reduction in a dynamic range of the image sensor.

An image sensor to which a pixel layout according to some example embodiments of the inventive concepts is applied may include four adjacent white pixels in which white filters are arranged and seven adjacent RGB pixels in which RGB color filters are respectively arranged. In the low-light environment, an image signal generated from four white pixels may be output as a white pixel value, and an image signal generated from seven RGB pixels may be output as an RGB pixel value, respectively. Thus, in the low-light environment, quality may be improved by improving the sensitivity of an image signal.

Moreover, as a white pixel value and an RGB pixel value are expressed as bit depths in the same range, an operating range of the image sensor may be improved and color interpolation between adjacent pixels may be enhanced.

Figure 5:
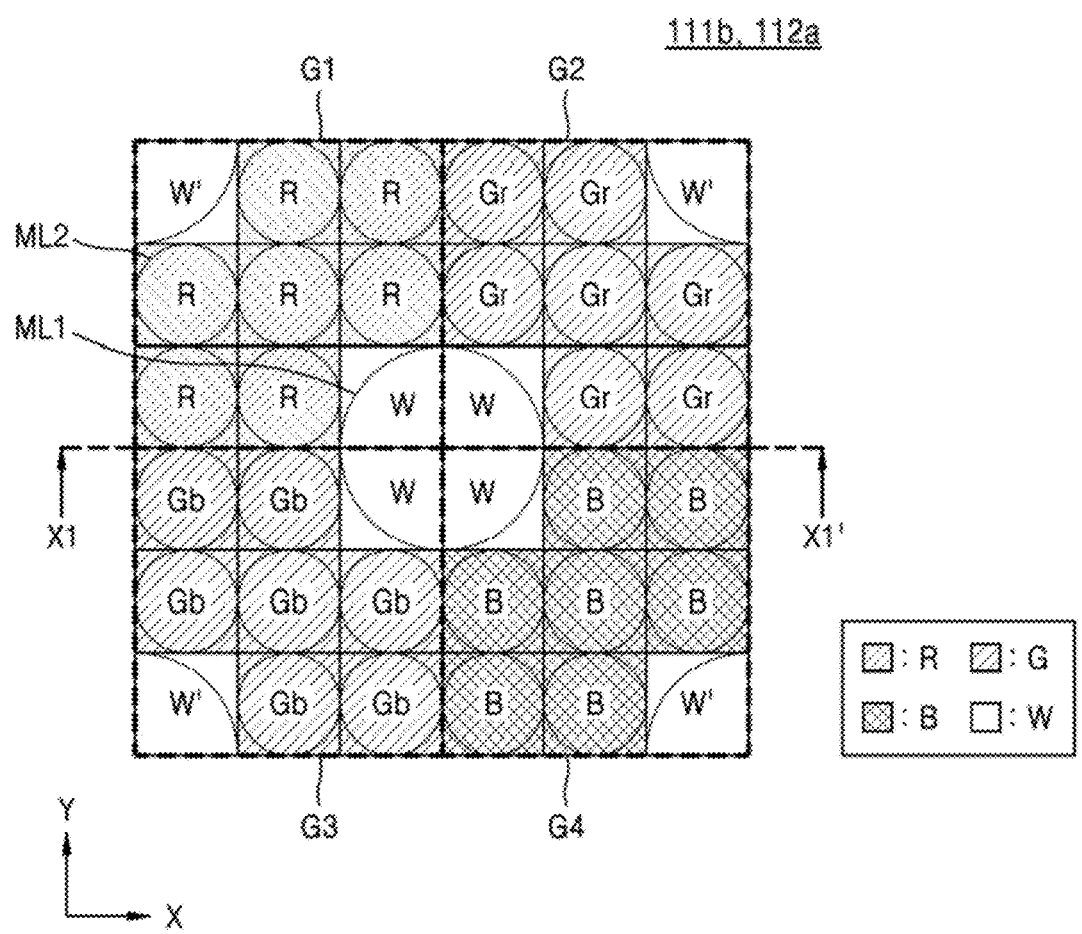
FIG. 5 is a block diagram showing a pixel layout according to some example embodiments of the inventive concepts.

FIG. 5 is a block diagram showing a pixel layout according to some example embodiments of the inventive concepts.

Referring to FIG. 5, a micro lens array 112a including a plurality of micro lenses may be arranged on a color filter array 111b. In some example embodiments of the inventive concepts, the color filter array 111b may have a layout of the color filter array 111b shown in FIG. 4.

A first micro lens ML1 may be arranged on (e.g., in the Z-axis direction) four adjacent white filters W among a plurality of color filters. For example, the first micro lens ML1 may be arranged in regions of the white filter W included in the first group G1, the white filter W included in the second group G2, the white filter W included in the third group G3, and the white filter W included in the fourth group G4. The second micro lenses ML2 may each be on a different second color filter CF2 of the color filter array 111b. For example, a second micro lens ML2 may be arranged on a red filter R, green filters Gr and Gb, and/or a blue filter B among the plurality of color filters of the color filter array 111b.

The first micro lens ML1 may have a structure for top-surface phase difference detection. For the first micro lens ML1, four photoelectric conversion elements arranged in left/right directions and top/bottom directions with respect to an optical axis of the first micro lens ML1 may be understood to be at least partially overlapped by the first micro lens ML1 (e.g., in the Z-axis direction) and thus may be understood to correspond to the first micro lens ML1. An image signal may provide a phase detection signal pair for focusing in the left/right direction or the up/down direction based on at least two signals among signals respectively output from the four photoelectric conversion elements. Restated, the four photoelectric conversion elements may be each configured to output (e.g., generate and transmit) signals, where at least two signals among the signals output from the four photoelectric conversion elements are output as a phase detection signal pair used for phase difference calculation.

The color filter array 111b may include white filters W' positioned in the diagonal direction with respect to the white filters W in which the first micro lens ML1 is arranged. Each of the white filters W' positioned to face each other in the diagonal direction may form a part of the four adjacent white filters (not shown), and a part of the first micro lens ML1 may be arranged on the white filter W'.

Figure 6:
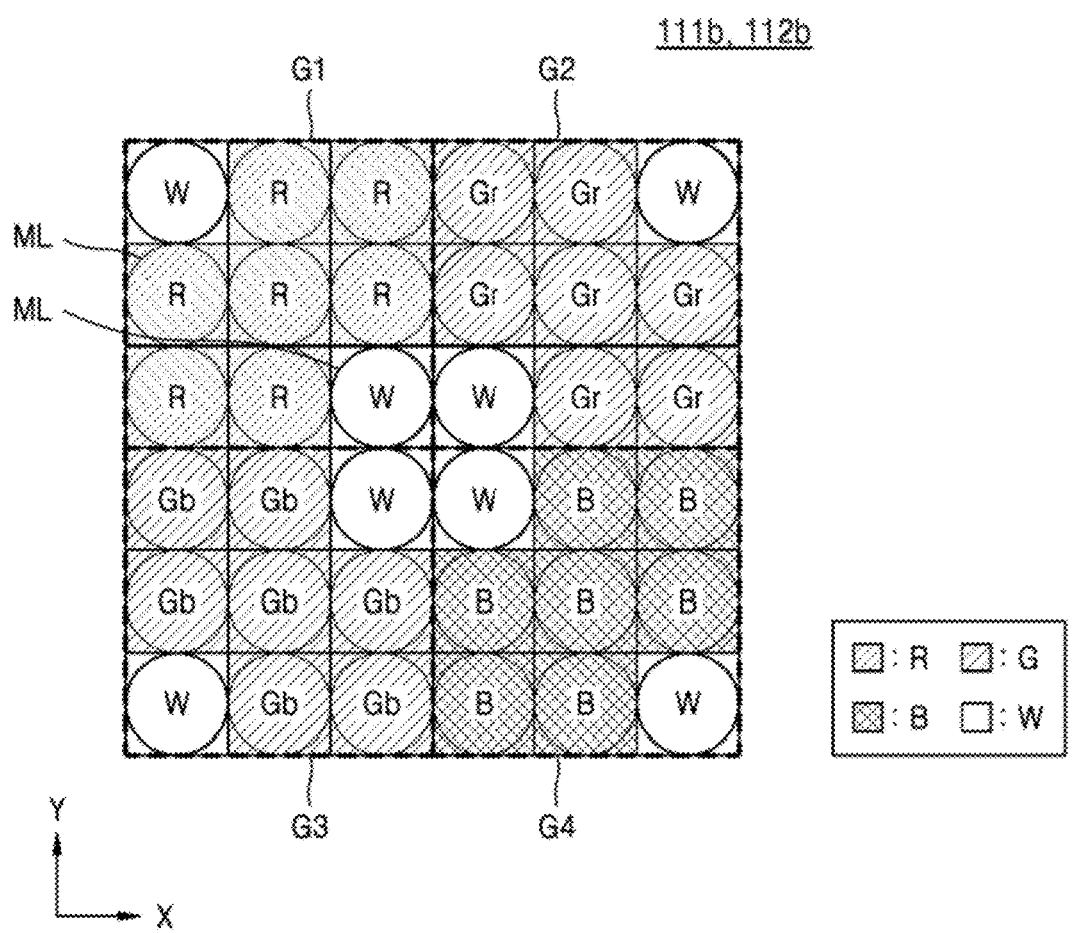
FIG. 6 is a block diagram showing a pixel layout according to some example embodiments of the inventive concepts.

FIG. 6 is a block diagram showing a pixel layout according to some example embodiments of the inventive concepts.

Referring to FIG. 6, a micro lens array 112b including a plurality of micro lenses may be arranged on a color filter array 111b. In some example embodiments of the inventive concepts, the color filter array 111b may have a layout of the color filter array 111b shown in FIG. 4.

As described with reference to FIG. 5, the micro lens array 112b may include the first micro lens ML1 arranged on the four adjacent white filters among the plurality of color filters and the second micro lenses ML2 respectively arranged on the RGB color filters among the plurality of color filters.

Alternatively, as described with reference to FIG. 6, the micro lens array 112b may include a plurality of micro lenses ML, respectively arranged on a plurality of color filters, i.e., white filters and RGB color filters.

Figure 7:
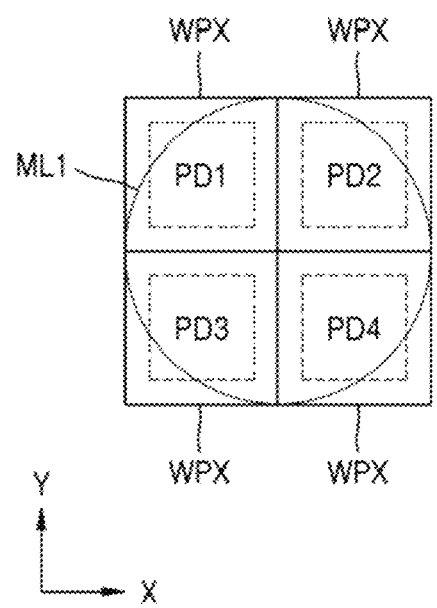
FIG. 7 is a block diagram showing photoelectric conversion elements for top-surface phase difference detection, according to some example embodiments of the inventive concepts.

FIG. 7 is a block diagram showing photoelectric conversion elements for top-surface phase difference detection, according to some example embodiments of the inventive concepts.

Referring to FIG. 7, the first micro lens ML1 may be arranged on four adjacent white pixels WPX in which white filters are arranged. The four adjacent white pixels WPX may include four photoelectric conversion elements PD1 through PD4 arranged in a left-right direction and a top-bottom direction with respect to the optical axis of the first micro lens ML1. Accordingly, and as shown in at least FIG. 7 it will be understood that a pixel array 110 may include four photoelectric conversion elements PD1 to PD4 that correspond to the first micro lens ML1 such that the first micro lens ML1 is on (e.g., at least partially overlaps in the Z-axis direction) the four photoelectric conversion elements PD1 to PD4. For example, the white pixel WPX included in the first group G1 may include a first photoelectric conversion element PD1 positioned in a left-top direction with respect to the optical axis of the first micro lens ML1. The white pixel WPX included in the second group G2 may include a second photoelectric conversion element PD2 positioned in a right-top direction with respect to the optical axis of the first micro lens ML1. The white pixel WPX included in the third group G3 may include a third photoelectric conversion element PD3 positioned in a left-bottom direction with respect to the optical axis of the first micro lens ML1. The white pixel WPX included in the fourth group G4 may include a fourth photoelectric conversion element PD4 positioned in a right-bottom direction with respect to the optical axis of the first micro lens ML1.

An image signal may output at least two of the signals respectively output from the four photoelectric conversion elements PD1 through PD4 as a phase detection signal pair for phase difference calculation. In a defocus situation, strengths of signals of a signal pair output from photoelectric conversion elements arranged in the left-right direction or the top-bottom direction may be different from each other. As will be described later with reference to FIG. 10, based on a phase detection signal pair provided by the image sensor, a processor may calculate a position of a focus in the left-right direction or the top-bottom direction in which strengths of signals of a phase detection signal pair match each other, a direction of the focus, etc.

In some example embodiments of the inventive concepts, the image sensor may output the phase detection signal pair for calculating a phase difference in the left-right direction from a signal pair output from photoelectric conversion elements. For example, the image sensor may output the phase detection signal pair from a pair of signals respectively output from the first photoelectric conversion element PD1 and the third photoelectric conversion element PD3. The image sensor may output the phase detection signal pair from a pair of signals respectively output from the second photoelectric conversion element PD2 and the fourth photoelectric conversion element PD4. The image sensor may output a phase detection signal pair from a first summation signal that sums signals respectively output from the first photoelectric conversion element PD1 and the third photoelectric conversion element PD3 and a second summation signal that sums signals respectively output from the second photoelectric conversion element PD2 and the fourth photoelectric conversion element PD4.

Accordingly, the four photoelectric conversion elements PD1 to PD4 may be configured to output a phase detection signal pair used for phase difference calculation in a left-right direction, where the phase detection signal pair includes at least one of a first signal pair output from a first photoelectric conversion element PD1 and a third photoelectric conversion element PD3 that are arranged in a first column, or a second signal pair output from a second photoelectric conversion element PD2 and a fourth photoelectric conversion element PD4 that are arranged in a second row.

In some example embodiments of the inventive concepts, the image sensor may output the phase detection signal pair for calculating a phase difference in the top/bottom directions from a signal pair output from photoelectric conversion elements. For example, the image sensor may output a phase detection signal pair from a pair of signals respectively output from the first photoelectric conversion element PD1 and the second photoelectric conversion element PD2. The image sensor may output the phase detection signal pair from a pair of signals respectively output from the third photoelectric conversion element PD3 and the fourth photoelectric conversion element PD4. The image sensor may output a phase detection signal pair in the top/bottom directions from a first summation signal that sums signals respectively output from the first photoelectric conversion element PD1 and the second photoelectric conversion element PD2 and a second summation signal that sums signals respectively output from the third photoelectric conversion element PD3 and the fourth photoelectric conversion element PD4.

Accordingly, the four photoelectric conversion elements PD1 to PD4 may be configured to output a phase detection signal pair used for phase difference calculation in an up-down direction, where the phase detection signal pair includes at least one of a first signal pair output from a first photoelectric conversion element PD1 and a second photoelectric conversion element PD2 that are arranged in a first row, or a second signal pair output from a third photoelectric conversion element PD3 and a fourth photoelectric conversion element PD4 that are arranged in a second row.

Figure 8:
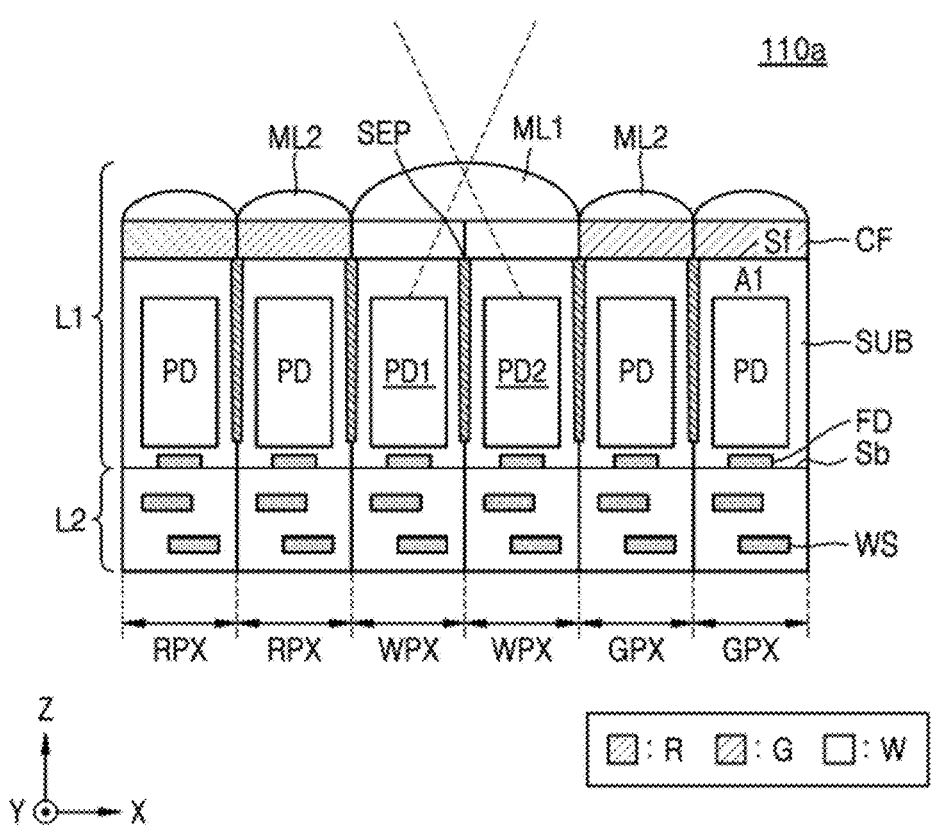
FIG. 8 is a vertical cross-sectional view of a pixel included in a pixel array, according to some example embodiments of the inventive concepts.

FIG. 8 is a vertical cross-sectional view of a pixel included in a pixel array, according to some example embodiments of the inventive concepts, which is a vertical cross-sectional view along a line X1-X1' of FIG. 5. Hereinbelow, FIG. 8 will be described with reference to FIG. 5.

Referring to FIG. 8, a pixel array 110a may include a plurality of pixels arranged in a row direction X. The plurality of pixels may include a red pixel RPX in which the red filter R is arranged, a white pixel WPX in which the white filter W is arranged, and a green pixel GPX in which the green filter Gr is arranged. However, a configuration of the plurality of pixels may be changed without being limited thereto.

The first micro lens ML1 may be arranged on two white pixels WPX arranged in the row direction X. The second micro lenses ML2 may be respectively arranged on the red pixel RPX and the green pixel GPX. The first micro lens ML1 may refract incident light to the first photoelectric conversion element PD1 and the second photoelectric conversion element PD2 on which the white filters W are respectively arranged. Light incident in the right direction (or in the bottom direction) with respect to the optical axis of the first micro lens ML1 may be incident to the first photoelectric conversion element PD1, and light incident in the left direction (or in the top direction) with respect to the optical axis of the first micro lens ML1 may be incident on the second photoelectric conversion element PD2. Thus, the first photoelectric conversion element PD1 and the second photoelectric conversion element PD2 may generate a signal pair for phase detection in the left-right direction or in the top-bottom direction.

A plurality of pixels may include a first layer L1 and a second layer L2 that are stacked in a Z-axis direction. The first layer L1 may be denoted as a photoelectric conversion layer, and may include a color filter CF formed on a substrate SUB, micro lenses ML1 and ML2, and a photoelectric conversion element formed on the substrate SUB, e.g., a photodiode PD. The second layer L2 may be denoted as a wiring layer, and a plurality of wires WS may be formed on the second layer L2. In some example embodiments, a pixel may be understood to include a color filter CF and at least a portion of a micro lens for example as shown in FIG. 8. Accordingly, the color filters and/or micro lenses as described herein, including color filters CF and/or micro lenses ML1 and/or ML2 as shown in FIG. 8, may be referred to interchangeably as being "in" one or more pixels that include the layers L1 and L2 as shown in FIG. 8 or "on" one or more pixels that refer to at least the photoelectric conversion devices PD, PD1, and/or PD2 thereof. For example, a pixel WPX, RPX, and/or GPX may be at least partially defined by a photoelectric conversion device PD, PD1, and/or PD2 alone or in combination with at least a portion of the substrate SUB, and a color filter CF on the photoelectric conversion device PD, PD1, and/or PD2 and corresponding portion of the substrate SUB as shown in FIG. 8 may be understood to be "on" a pixel WPX, RPX, and/or GPX associated with and/or defined by the photoelectric conversion device PD, PD1, and/or PD2 and corresponding portion of the substrate SUB. In another example, a pixel WPX, RPX, and/or GPX may be at least partially defined by a photoelectric conversion device PD, PD1, and/or PD2 alone or in combination with at least a portion of the substrate SUB and corresponding portions of the first and second layers L1 and L2 overlapping with the photoelectric conversion device PD, PD1, and/or PD2 and portion of the substrate SUB in the Z-axis direction, and a color filter CF at least partially overlapping a given photoelectric conversion device PD, PD1, and/or PD2 may be understood to be "in" a pixel WPX, RPX, and/or GPX associated with and/or defined by at least the photoelectric conversion device PD, PD1, and/or PD2 and corresponding portion of the substrate SUB.

The substrate SUB may be a silicon wafer, a silicon-on-insulator (SOI) substrate, or a semiconductor epitaxial layer. The substrate SUB may include a first surface Sf and a second surface Sb which face each other. For example, the first surface Sf may be a front surface of the substrate SUB, and the second surface Sb may be a rear surface of the substrate SUB. Light may be incident to the second surface Sb.

When a plurality of adjacent pixels form a pixel group, a pixel array may be formed by including a plurality of pixel isolation films SEP to reduce interference between the plurality of adjacent pixels. The plurality of pixel isolation films SEP or a P-type ion injection region, which extends from the second surface Sb of the substrate SUB to the first surface Sf of the substrate SUB, may be formed on the substrate SUB. For example, a first region A1 may be doped with impurities of a first conductive type (e.g., a P type). The photodiode PD may be formed in the first region A1. For example, well regions doped with impurities of a second conductive type (e.g., an N type) may be formed as the photodiode PD. Accordingly, as shown in at least FIG. 8 in view of FIG. 7, when a pixel array 110a includes four photoelectric conversion elements PD1 to PD4 that correspond to the first micro lens ML1 such that the first micro lens ML1 is on (e.g., at least partially overlaps in the Z-axis direction) the four photoelectric conversion elements PD1 to PD4, the pixel array 110a may further include a plurality of isolation films SEP that may interpose between adjacent photoelectric conversion elements and thus may isolate the four photoelectric conversion elements PD1 to PD4 from direct contact with each other, such that the four photoelectric conversion elements PD1 to PD4 are isolated from direct contact with each other by at least the plurality of isolation films SEP.

Under the photodiode PD included in the first layer L1, a floating diffusion node FD may be formed. For example, gate and source terminals of transistors may be formed between the photodiode PD and the first surface Sf. Signals may be transmitted to and received from the transistors through the plurality of wires WS of the wiring layer L2.

Figure 9:
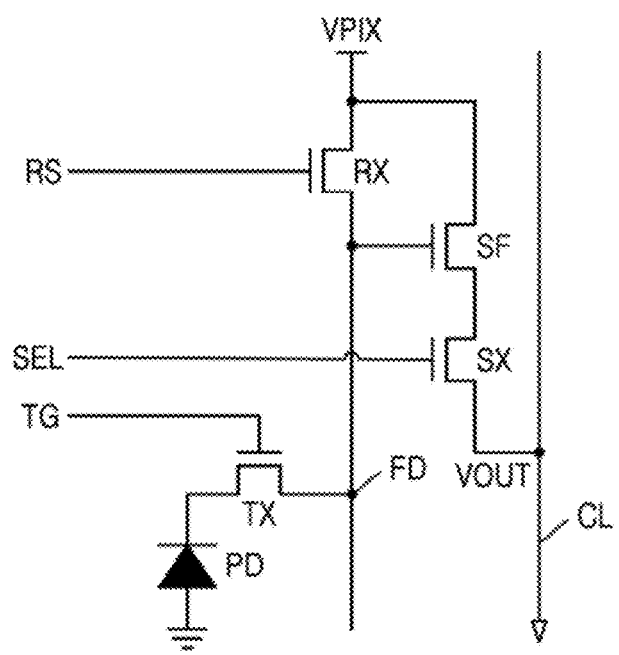
FIG. 9 is a circuit diagram of a photoelectric conversion element, according to some example embodiments of the inventive concepts.

FIG. 9 is a circuit diagram of a photoelectric conversion element, according to some example embodiments of the inventive concepts.

Referring to FIG. 9, one pixel (e.g., the red pixel RPX, the white pixel WPX, and the green pixel GPX of FIG. 8) may include a photoelectric conversion element PD, a transmission transistor TX, a selection transistor SX, a source follower SF, and a reset transistor RX. However, without being limited thereto, at least one of the transmission transistor TX, the selection transistor SX, the source follower SF, or the reset transistor RX may be omitted.

The photoelectric conversion element PD may generate photocharges that vary with the intensity of light. For example, the photoelectric conversion element PD, as a P-N junction diode, may generate charges in proportion to the amount of incident light. For example, the photoelectric conversion element PD may be implemented as a photo diode, a photo transistor, a photo gate, a pinned photo diode, or a combination thereof.

The transmission transistor TX may transmit the photocharges generated by the photoelectric conversion element PD to the floating diffusion region FD, according to a transmission control signal TG. When the transmission transistor TX is turned on, the photocharges generated in the photoelectric conversion element PD may be transmitted to the floating diffusion region FD and may be accumulatively stored in the floating diffusion region FD.

The reset transistor RX may periodically reset the charges accumulated in the floating diffusion region FD, according to a reset control signal RS. A first terminal of the reset transistor RX may be connected with the floating diffusion region FD, and a second terminal of the reset transistor RX may be connected to a power voltage VPIX. When the reset transistor RX is turned on according to the reset control signal RS, the power voltage VPIX connected to the reset transistor RX may be transmitted to the floating diffusion region FD. When the reset transistor RX is turned on, the charges accumulated in the floating diffusion region FD may be discharged such that the floating diffusion region FD may be reset.

The source follower SF may be controlled according to the amount of photocharges accumulated in the floating diffusion region FD. The source follower SF, which is a buffer amplifier, may buffer a signal corresponding to charges charged in the floating diffusion region FD. The source follower SF may amplify a potential change in the floating diffusion region FD and output a corresponding result as a pixel signal VOUT to a column output line CL which may be selectively output to the column output line CL by the selection transistor SX according to a select control signal SEL.

Figure 10:
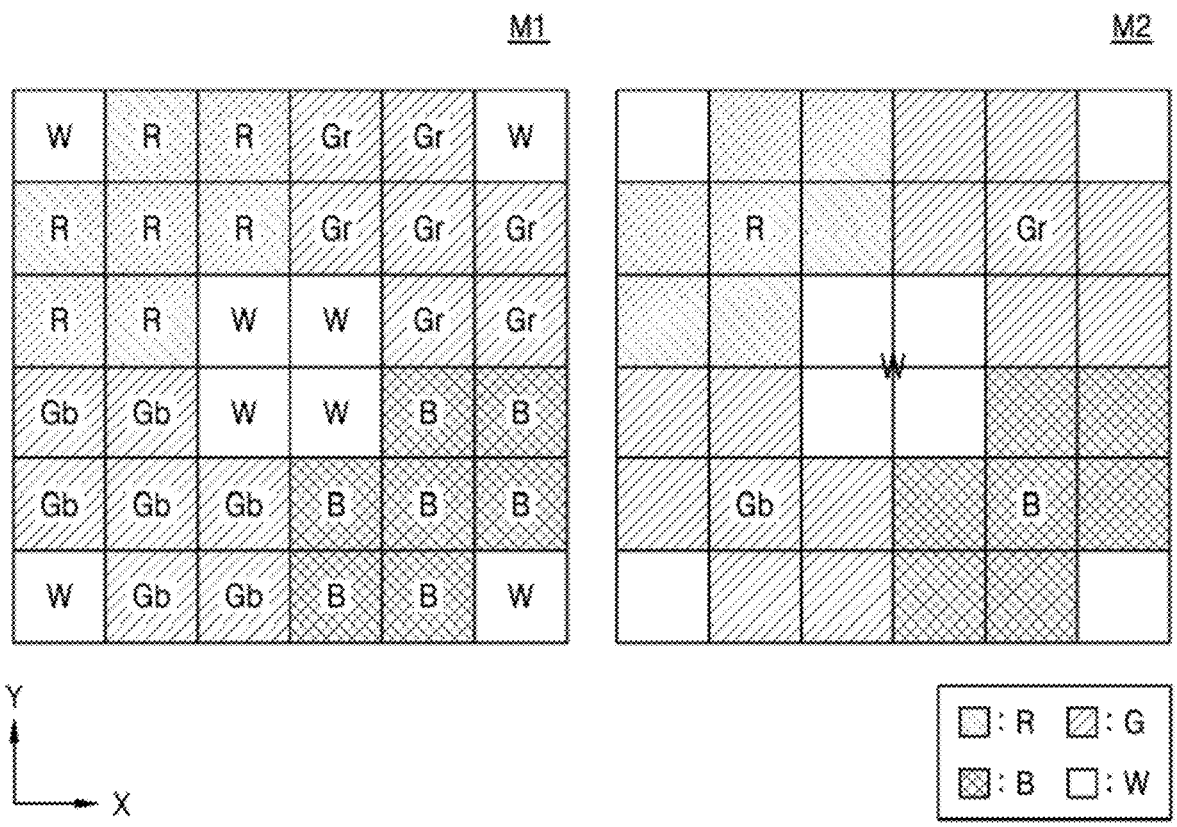
FIG. 10 shows a read-out method of an image sensor including a plurality of pixels according to some example embodiments of the inventive concepts.

FIG. 10 shows a read-out method of an image sensor including a plurality of pixels according to some example embodiments of the inventive concepts.

Referring to FIG. 10, an image sensor and/or a camera module in which the image sensor is located according to some example embodiments of the inventive concepts may operate in a first operation mode M1 or a second operation mode M2 according to an illumination environment. It will be understood that descriptions herein regarding an image sensor operating in one or more operation modes may be interchangeably applied to a camera module including the image sensor operating in the one or more operations modes.

The image sensor may operate in the first operation mode M1 in a high-illumination environment, and a pixel value may be generated in the unit of a pixel in the first operation mode M1. For example, the image sensor may operate in the first operation mode M1 in a high-illumination environment such as in the daytime, thus generating a high-resolution image. In the first operation mode M1, each of a plurality of pixels may independently output a pixel signal (e.g., VOUT of FIG. 9) through a column output line (e.g., CL of FIG. 9) as a transmission transistor (e.g., TX of FIG. 9) is turned on in response to a transmission control signal (e.g., TG of FIG. 9).

Meanwhile, the image sensor may operate in the second operation mode M2 in the low-light environment, and a pixel value may be generated in the unit of a group including a plurality of adjacent pixels in the second operation mode M2. For example, the image sensor may operate in the second operation mode M2 in the low-light environment such as at night, thus generating an image with a quality that is not degraded in the low-light environment. Accordingly, as shown in FIG. 10, the image sensor may output (e.g., generate and transmit) a first pixel signal from the four adjacent first pixels of the pixel array and second pixel signals from second pixels belonging to each group of the plurality of groups, based on the image sensor (and/or a camera module including same) operating in the second operation mode M2.

The image sensor according to some example embodiments of the inventive concepts may generate a white pixel signal from four adjacent white pixels and generate an RGB pixel signal from seven RGB pixels in the second operation mode M2. After a plurality of adjacent pixels respectively output pixel signals, the image sensor may sum the pixel signals in various manners. For example, the image sensor may output a pixel signal through each of the plurality of adjacent pixels, convert the pixel signal into a digital signal through an ADC circuit, and sum digital signals corresponding to the plurality of adjacent pixels, thus generating one pixel signal. Alternatively, the image sensor may output a pixel signal through each of the plurality of adjacent pixels and sum analog signals corresponding to the plurality of adjacent pixels, thus converting them into a digital signal.

Alternatively, the image sensor may sum pixel signals based on a structure where the plurality of adjacent pixels share the floating diffusion region (e.g., FD of FIG. 9). For example, a plurality of pixels belonging to the same column may be designed to share the floating diffusion region. The photocharges generated in respective photodiodes (e.g., PD of FIG. 9) corresponding to the plurality of pixels belonging to the same column may be accumulated in the shared floating diffusion region, such that the charges generated in the plurality of pixels may be output through a column output line to form one pixel signal.

However, the inventive concepts are not limited thereto, and arrangement of pixels sharing a floating diffusion region may be changed. For example, the inventive concepts may be designed such that pixels belonging to the same row share the floating diffusion region and pixels corresponding to the same color share the floating diffusion region.

Figure 11:
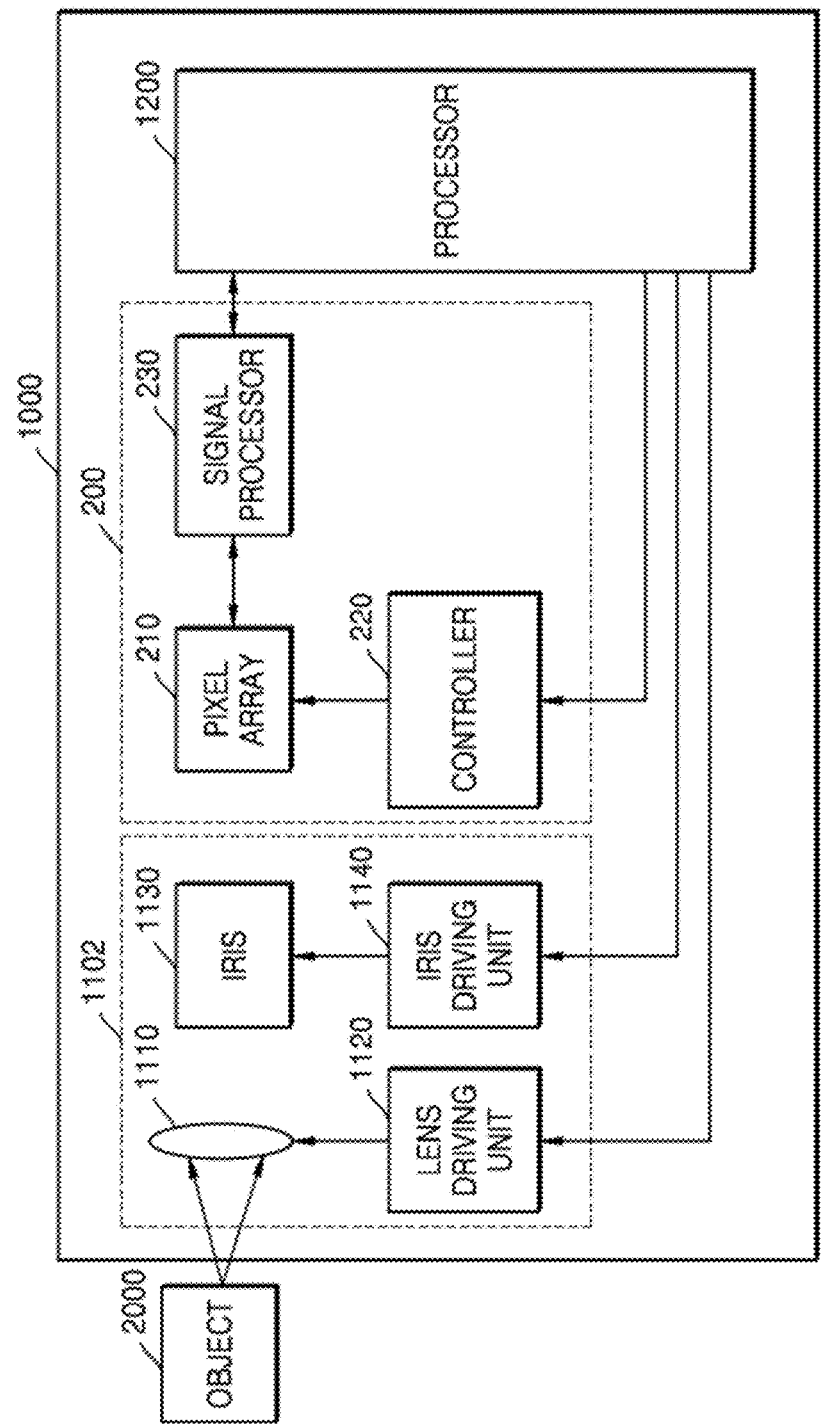
FIG. 11 is a schematic block diagram showing an image sensor for top-surface phase difference detection, according to some example embodiments of the inventive concepts.

FIG. 11 is a schematic block diagram showing an image sensor for top-surface phase difference detection, according to some example embodiments of the inventive concepts.

Referring to FIG. 11, a digital imaging device 1000 (also referred to herein as a camera module, camera device, electronic device, or the like) may include an imaging device 1102, an image sensor 200, and a processor 1200. The digital imaging device 1000 may include a focus detection function. The image sensor 200 may be any of the image sensors according to any of the example embodiments. The overall operation of the digital imaging device 1000 may be controlled by the processor 1200. The processor 1200 may provide a control signal for an operation of each component to a lens driving unit 1120, an iris driving unit 1140, a controller 220, etc.

The imaging device 1102, which is a component for receiving light, may include a lens 1110, the lens driving unit 1120, an iris 1130, and the iris driving unit 1140. The lens 1110 may include a plurality of lenses.

The lens driving unit 1120 may communicate information regarding focus detection with the processor 1200, and adjust a position of the lens 1110 according to a control signal provided by the processor 1200. The lens driving unit 1120 may move the lens 1110 in a direction to increase or reduce a distance from an object 2000. In this way, the distance between the lens 1110 and the object 2000 may be adjusted. Depending on a position of the lens 1110, the object 2000 may be in focus or out of focus.

For example, when the distance between the lens 1110 and the object 2000 is relatively close, the lens 1110 may be out of a focal position for focusing on the object 2000, and a phase different may occur between images captured by the image sensor 100. The lens driving unit 1120 may move the lens 1110 in a direction to increase the distance from the object 2000, based on the control signal provided from the processor 1200.

Alternatively, when the distance between the lens 1110 and the object 2000 is relatively long, the lens 1110 may be out of the focal position, and a phase different may occur between the images captured by the image sensor 100. The lens driving unit 1120 may move the lens 1110 in a direction to reduce the distance from the object 2000, based on the control signal provided from the processor 1200.

The image sensor 200 may convert incident light into an image signal. The image sensor 200 may include a pixel array 210, a controller 220, and a signal processor 230. An optical signal passing through the lens 1110 and the iris 1130 may arrive at a light-receiving surface of the pixel array 210 and form an image of a subject.

The pixel array 210 may be a complementary metal oxide semiconductor image sensor (CIS) that converts an optical signal into an electrical signal. The sensitivity of the pixel array 210 may be adjusted by the controller 220. The pixel array 210 may include a plurality of pixels that convert an optical signal into an electrical signal. Each of the plurality of pixels may generate a pixel signal according to the intensity of detected light.

The image sensor 200 may provide a phase detection signal pair to the processor 1200. The processor 1200 may perform phase difference calculation by using a phase detection signal. For example, the image sensor 100 may provide a phase detection signal pair to the processor 1200 that may obtain a position of a focus, a direction of the focus, a distance between the object 2000 and the image sensor 200, etc., as a result of phase difference calculation. The processor 1200 may output a control signal to the lens driving unit 1120 to move a position of the lens 1110 based on the result of phase difference calculation.

The processor 1200 may obtain distance information using a phase difference reflected from the subject, based on the phase detection signal pair provided from the image sensor 200. The processor 1200 may obtain image information of the subject from the image signal provided from the image sensor 200. The processor 1200 may generate a three-dimensional depth image based on the obtained distance information and image information.

For example, in example embodiments where the image sensor 200 includes a pixel array further including a plurality of pixels arranged in a matrix, wherein the plurality of pixels are divided into a plurality of groups that each include a plurality of first pixels and a plurality of second pixels, wherein each group of the plurality of groups includes nine color filters arranged in three rows and three columns, and wherein the image sensor further includes white filters on four adjacent first pixels among the plurality of pixels, and identical color filters corresponding to a corresponding group of the plurality of groups respectively on the plurality of second pixels among the plurality of pixels, the image sensor 200 may output at least two pixel signals that are respectively output from the four adjacent first pixels as a phase detection signal pair used for phase difference calculation, and the processor 1200 may generate depth information of a subject based on the phase detection signal pair.

The processor 1200 may reduce noise for an input signal and perform image signal processing for quality improvement, such as gamma correction, color filter array interpolation, color matrix, color correction, color enhancement, etc., on the input signal. The processor 1200 may also generate an image file by compressing image data generated through image signal processing for quality improvement, or may restore the image data from the image file.

Figure 12:
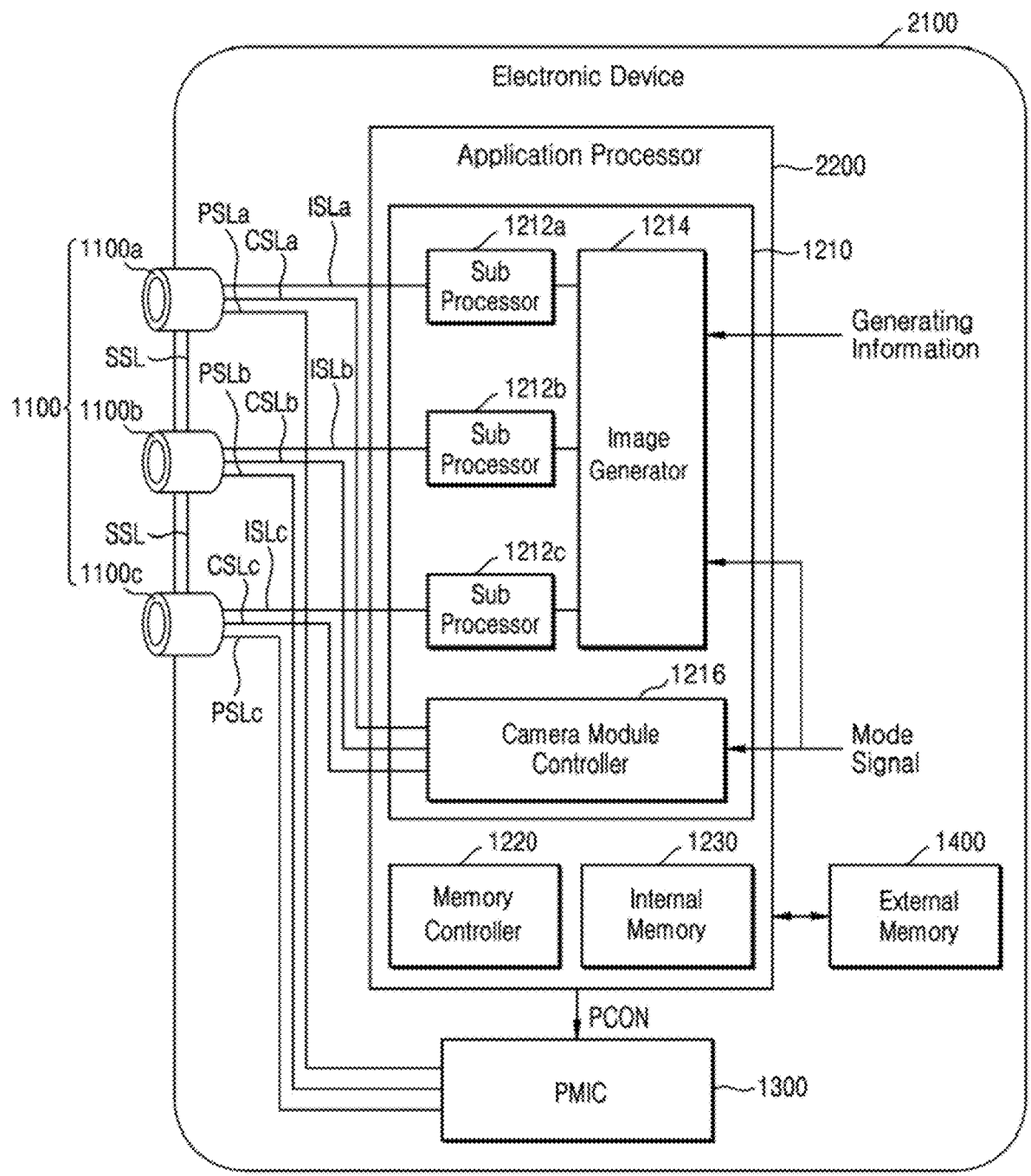
FIG. 12 is a block diagram of an electronic device including a multi-camera module, according to some example embodiments of the inventive concepts.
Figure 13:
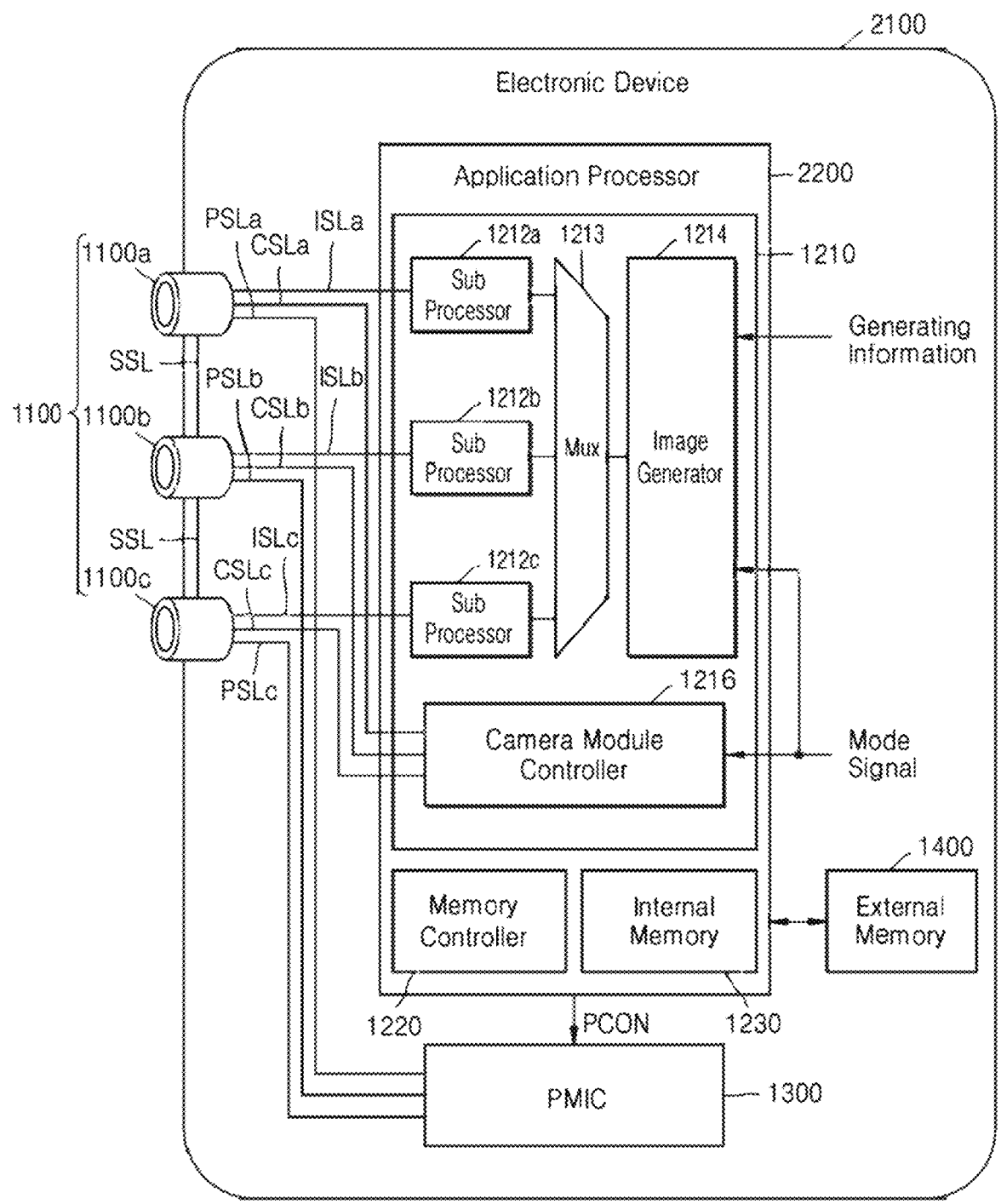
FIG. 13 is a block diagram of an electronic device including a multi-camera module, according to some example embodiments of the inventive concepts.
Figure 14:
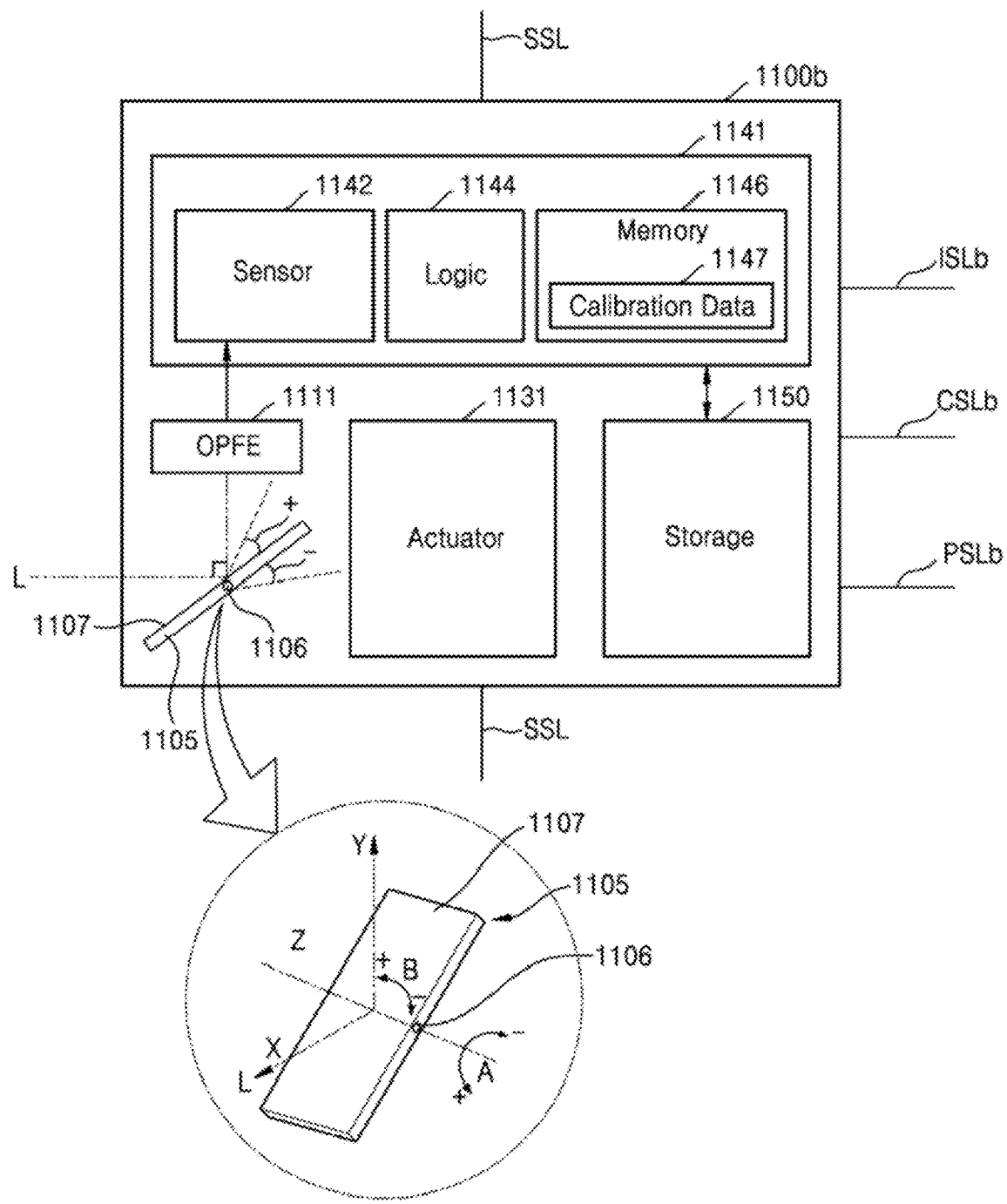
FIG. 14 is a detailed block diagram of a camera module of FIGS. 12 and 13, according to some example embodiments of the inventive concepts.

FIGS. 12 and 13 are block diagrams of an electronic device including a multi-camera module (also referred to herein interchangeably as a multi-camera device), according to some example embodiments of the inventive concepts. FIG. 14 is a detailed block diagram of a camera module shown in FIGS. 12 and 13.

Referring to FIG. 12, an electronic device 2100 (also referred to herein as a camera module, camera device, digital imaging device, or the like) may include a camera module group 1100, an application processor 2200, a power management integrated circuit (PMIC) 1300, and an external memory 1400.

The camera module group 1100 may include a plurality of camera modules 1100a, 1100b, and 1100c, which may each be interchangeably referred to as a camera device. Although some example embodiments of the inventive concepts are shown in the drawing where the three camera modules 1100a, 1100b, and 1100c are arranged, some example embodiments of the inventive concepts are not limited thereto. In some example embodiments of the inventive concepts, the camera module group 1100 may include two camera modules or n (n is a natural number greater than or equal to 4) camera modules.

Hereinafter, referring to FIG. 14, a detailed structure of the camera module 1100b will be described, but the following description may be equally applied to other camera modules 1100a, 1100b, and 1100c according to some example embodiments of the inventive concepts.

Referring to FIG. 14, the camera module 1100b may include a prism 1105, an optical path folding element (OPFE) 1111, an actuator 1131, an image sensing device 1141, and a storage device 1150.

The prism 1105 may include a reflective surface 1107 of a light reflective material to shift a path of light L incident from outside.

In some example embodiments of the inventive concepts, the prism 1105 may change a path of light L incident in the first direction X into a second direction Y that is perpendicular to the first direction X. In addition, the prism 1105 may rotate the reflective surface 1107 of a light reflective material in a direction A with respect to a central axis 1106 or in a direction B with respect to the central axis 1106 to change a path of the light L incident in the first direction X into the second direction Y that is perpendicular to the first direction X. In this case, the OPFE 1111 may move in a third direction Z that is perpendicular to the first direction X and the second direction Y.

In some example embodiments of the inventive concepts, as is shown, a maximum rotation angle of the prism 1105 in the direction A may be less than or equal to 15 degrees in a direction plus (+) A, and may be greater than 15 degrees in a direction minus (−) A, without being limited thereto.

In some example embodiments of the inventive concepts, the prism 1105 may move within 20 degrees or between 10 degrees and 20 degrees, or between 15 degrees and 20 degrees in a direction plus (+) or minus (−) B, in which a moving angle may be the same angle in the direction plus (+) or minus (−) B or may be an almost similar angle within 1 degree.

In some example embodiments of the inventive concepts, the prism 1105 may move the reflective surface 1107 of the light reflective material in the third direction (e.g., the direction Z) that is parallel to an extending direction of the central axis 1106.

In some example embodiments of the inventive concepts, the camera module 1100b may include two or more prisms, such that a path of the light L incident in the first direction X may be changed variously to the second direction Y that is perpendicular to the first direction X, to the first direction X or the third direction Z, and to the second direction Y, etc.

The OPFE 1111 may include optical lenses of, e.g., m (herein, m is a natural number) groups. m lenses may move in the second direction Y to change an optical zoom ratio of the camera module 1100b. For example, for a basic optical zoom ratio of the camera module 1100b being Z, when m optical lenses included in the OPFE 1111 are moved, the optical zoom ratio of the camera module 1100b may be changed into an optical zoom ratio of 3Z or 5Z or higher.

The actuator 1131 may move the OPFE 1111 or an optical lens (hereinafter, referred to as an optical lens) to a particular position. For example, the actuator 1131 may adjust the position of the optical lens such that an image sensor 1142 is positioned at a focal length of the optical lens.

The image sensing device 1141 may include the image sensor 1142, a control logic 1144, and memory 1146. The image sensor 1142 may be any of the image sensors according to any of the example embodiments. The image sensor 1142 may sense an image of a sensing target by using the light L provided through the optical lens. The control logic 1144 may control the overall operation of the camera module 1100b and process the sensed image. For example, the control logic 1144 may control the operation of the camera module 1100b according to a control signal provided through a control signal line CSLb and extract image data corresponding to a particular image (e.g., a face, arms, legs, etc., of a person in an image) from the sensed image.

In some example embodiments of the inventive concepts, the control logic 1144 may perform image processing, such as encoding, noise reduction, etc., on the sensed image.

The memory 1146 may store information required for the operation of the camera module 1100b, such as calibration data 1147. The calibration data 1147 may include, as information required for the camera module 1100b to generate image data by using the light L provided from outside, for example, information about a degree of rotation, information about a focal length, information about an optical axis, etc. When the camera module 1100b is implemented in the form of a multi-state camera having a focal length changing with the position of the optical lens, the calibration data 1147 may include a focal length value for each position (each state) of the optical lens and information related to auto focusing.

The storage device 1150 may store image data sensed through the image sensor 1142. The storage device 1150 may be positioned outside the image sensing device 1141, and may be implemented in a form stacked with a sensor chip of the image sensing device 1141. In some example embodiments of the inventive concepts, the image sensor 1142 may be configured as a first chip and the control logic 1144, the storage device 1150, and the memory 1146 may be configured as a second chip, such that the two chips may be stacked.

In some example embodiments of the inventive concepts, the storage device 1150 may be implemented as electrically erasable programmable read-only memory (EEPROM), but embodiments of the inventive concepts are not limited thereto. In some example embodiments of the inventive concepts, the image sensor 1142 may include a pixel array, and the control logic 1144 may include an analog-to-digital converter and an image signal processor for processing a sensed image.

With reference to FIGS. 12 and 14 together, in some example embodiments of the inventive concepts, each of the plurality of camera modules 1100a, 1100b, and 1100c may include the actuator 1131. Thus, each of the plurality of camera modules 1100a, 1100b, and 1100c may include identical or different calibration data 1147 corresponding to the operation of the actuator 1131 included therein.

In some example embodiments of the inventive concepts, one camera module (e.g., 1100b) among the plurality of camera modules 1100a, 1100b, and 1100c may be a camera module in the form of a folded lens including the prism 1105 and the OPFE 1111, and the other camera modules (e.g., 1100a and 1100c) may be camera modules in a vertical form which do not include the prism 1105 and the OPFE 1111, without being limited thereto.

In some example embodiments of the inventive concepts, one camera module (e.g., 1100c) among the plurality of camera modules 1100a, 1100b, and 1100c may be, for example, a depth camera in a vertical form, which extracts depth information using infrared ray (IR). In this case, the application processor 2200 may generate a three-dimensional (3D) depth image by merging image data provided from the depth camera and image data provided from another camera module (e.g., 1100a or 1100b).

In some example embodiments of the inventive concepts, at least two camera modules (e.g., 1100a and 1100b) among the plurality of camera modules 1100a, 1100b, and 1100c may have different fields of view (or viewing angles). In this case, for example, optical lenses of the at least two camera modules (e.g., 1100a and 1100b) among the plurality of camera modules 1100a, 1100b, and 1100c may be different from each other, without being limited thereto.

Moreover, in some example embodiments of the inventive concepts, the plurality of camera modules 1100a, 1100b, and 1100c may have different fields of view. For example, the camera module 1100a may be an ultrawide camera, the camera module 1100b may be a wide camera, and the camera module 1100c may be a tele-camera, without being limited thereto. In this case, optical lenses respectively included in the plurality of camera modules 1100a, 1100b, and 1100c may be different from one another, without being limited thereto.

In some example embodiments of the inventive concepts, the plurality of camera modules 1100a, 1100b, and 1100c may be arranged physically separated from one another. That is, the independent image sensor 1142 may be arranged in each of the plurality of camera modules 1100a, 1100b, and 1100c instead that the plurality of camera modules 1100a, 1100b, and 1100c use a sensing region of one image sensor 1142 in a divided manner.

Referring back to FIG. 12, the application processor 2200 may include an image processing device 1210, a memory controller 1220, and internal memory 1230. The application processor 2200 may be implemented, for example, as a separate semiconductor chip, separately from the plurality of camera modules 1100a, 1100b, and 1100c.

The image processing device 1210 may include a plurality of sub image processors 1212a, 1212b, and 1212c, an image generator 1214, and a camera module controller 1216.

The image processing device 1210 may include the plurality of sub image processors 1212a, 1212b, and 1212c of a number corresponding to the number of camera modules 1100a, 1100b, and 1100c.

Image data generated from the camera module 1100a may be provided to the sub image processor 1212a through an image signal line ISLa, and image data generated from the camera module 1100b may be provided to the sub image processor 1212b through an image signal line ISLb, and image data generated from the camera module 1100c may be provided to the sub image processor 1212c through an image signal line ISLc. Such image data transmission may be performed using, for example, a camera serial interface (CSI) based on a mobile industry processor interface (MIPI), without being limited thereto.

Meanwhile, in some example embodiments of the inventive concepts, one sub image processor may be arranged to correspond to a plurality of camera modules. For example, the sub image processor 1212a and the sub image processor 1212b may be integrated as one sub image processor rather than separated from each other as shown, and the image data provided from the camera module 1100a and the camera module 1100c may be selected through a selection device (e.g., a multiplexer) and then provided to the integrated sub image processor. In this case, the sub image processor 1212b may be provided with the image data from the camera module 1100b, rather than being integrated.

In some example embodiments of the inventive concepts, image data generated from the camera module 1100a may be provided to the sub image processor 1212a through the image signal line ISLa, and image data generated from the camera module 1100b may be provided to the sub image processor 1212b through the image signal line ISLb, and image data generated from the camera module 1100c may be provided to the sub image processor 1212c through the image signal line ISLc. The image data processed in the sub image processor 1212b may be directly provided to the image generator 1214, but the image data processed by the sub image processor 1212a and the image data processed by the sub image processor 1212c may be provided to the image generator 1214 after any one of them is selected through the selection element (e.g., the multiplexer), etc.

Each of the sub image processors 1212a, 1212b, and 1212c may perform image processing, such as bad pixel correction, 3 A adjustment including auto-focus correction, auto-white balance, and auto-exposure, noise reduction, sharpening, gamma control, remosaic, etc., with respect to image data provided from the camera modules 1100a, 1100b, and 1100c.

In some example embodiments of the inventive concepts, remosaic signal processing may be performed by each of the camera modules 1100a, 1100b, and 1100c, and then corresponding results may be respectively provided to the sub image processors 1212a, 1212b, and 1212c.

The image data processed in each of the sub image processors 1212a, 1212b, and 1212c may be provided to the image generator 1214. The image generator 1214 may generate an output image by using image data provided from each of the sub image processors 1212a, 1212b, and 1212c according to image generating information or a mode signal.

More specifically, the image generator 1214 may generate the output image by merging at least a part of the image data generated from the sub image processors 1212a, 1212b, and 1212c, according the image generating information or the mode signal. In addition, the image generator 1214 may generate the output image by selecting any one of the image data generated from the sub image processors 1212a, 1212b, and 1212c, according the image generating information or the mode signal.

In some example embodiments of the inventive concepts, the image generating information may include a zoom signal or a zoom factor. In some example embodiments of the inventive concepts, the mode signal may be, for example, a signal based on a user-selected mode.

When the image generating information is a zoom signal (a zoom factor) and the camera modules 1100a, 1100b, and 1100c have different observation fields (viewing angles), the image generator 1214 may perform different operations according to a type of the zoom signal. For example, when the zoom signal is a first signal, the image generator 1214 may generate the output image by using image data output from the sub image processor 1212a between image data output from the sub image processor 1212a and image data output from the sub image processor 1212c, and image data output from the sub image processor 1212b. For example, when the zoom signal is a second signal that is different from the first signal, the image generator 1214 may generate the output image by using image data output from the sub image processor 1212c between the image data output from the sub image processor 1212a and the image data output from the sub image processor 1212c, and the image data output from the sub image processor 1212b. When the zoom signal is a third signal that is different from the first signal and the second signal, the image generator 1214 may generate the output image by selecting any one of the image data output from each of the sub image processors 1212a, 1212b, and 1212c, without performing such image data merging. However, some example embodiments of the inventive concepts are not limited thereto, and a method of processing image data may be modified and carried out as needed.

Referring to FIG. 13, in some example embodiments of the inventive concepts, the image processing device 1210 may further include a selector 1213 that selects outputs of the sub image processors 1212a, 1212b, and 1212c to transmit the selected output to the image generator 1214.

In this case, the selector 1213 may perform different operations according to a zoom signal or a zoom factor. For example, when the zoom signal is a fourth signal (e.g., a zoom ratio is a first ratio), the selector 1213 may select any one of outputs of the sub image processors 1212a, 1212b, and 1212c and transmit the selected output to the image generator 1214.

When the zoom signal is a fifth signal (e.g., a zoom ratio is a second ratio) that is different from the fourth signal, the selector 1213 may sequentially transmit p (p is a natural number greater than or equal to 2) outputs among the outputs of the sub image processors 1212a, 1212b, and 1212c to the image generator 1214. For example, the selector 1213 may sequentially transmit outputs of the sub image processors 1212b and 1212c to the image generator 1214. The selector 1213 may sequentially transmit outputs the sub image processors 1212a and 1212b to the image generator 1214. The image generator 1214 may generate one output image by merging p outputs sequentially provided.

Herein, image processing such as demosaic, down-scaling to a video/preview resolution size, gamma correction, high dynamic range (HDR) processing, etc., may be performed in advance in the sub image processors 1212a, 1212b, and 1212c, and then processed image data may be transmitted to the image generator 1214. Thus, even when the processed image data is provided to the image generator 1214 in one signal line through the selector 1213, an image merging operation of the image generator 1214 may be performed at high speed.

In some example embodiments of the inventive concepts, the image generator 1214 may receive a plurality of pieces of image data having different exposure times from at least one of the plurality of sub image processors 1212a, 1212b, and 1212c and perform HDR processing with respect to the plurality of pieces of image data, thereby generating merged image data having an increased dynamic range.

The camera module controller 1216 may provide a control signal to each of the camera modules 1100a, 1100b, and 1100c. The control signal generated from the camera module controller 1216 may be provided to the corresponding camera modules 1100a, 1100b, and 1100c through separated control signal lines CSLa, CSLb, and CSLc.

Any one of the plurality of camera modules 1100a, 1100b, and 1100c may be designated as a master camera (e.g., 1100b) according to image generating information including a zoom signal or a mode signal, and the other camera modules (e.g., 1100a and 1100c) may be designated as slave cameras. Such information may be included in a control signal and provided to the corresponding camera modules 1100a, 1100b, and 1100c through the separated control signal lines CSLa, CSLb, and CSLc.

A camera module operating as a master camera or a slave camera may be changed according to a zoom factor or an operation mode signal. For example, when a viewing angle of the camera module 1100a is larger than that of the camera module 1100b and a zoom factor indicates a low zoom ratio, the camera module 1100a may operate as a master camera and the camera module 1100b may operate as a slave camera. On the other hand, when the zoom factor indicates a high zoom ratio, the camera module 1100b may operate as a master camera and the camera module 1100a may operate as a slave camera.

In some example embodiments of the inventive concepts, a control signal provided to each of the camera modules 1100a, 1100b, and 1100c from the camera module controller 1216 may include a sync enable signal. For example when the camera module 1100b is a master camera and the camera modules 1100a and 1100c are slave cameras, the camera module controller 1216 may transmit the sync enable signal to the camera module 1100b. The camera module 1100b provided with the sync enable signal may generate a sync signal based on the sync enable signal and provide the generated sync signal to the camera modules 1100a and 1100c through a sync signal line SSL. The camera module 1100b and the camera modules 1100a and 1100c may be synchronized with the sync signal and transmit image data to the application processor 2200.

In some example embodiments of the inventive concepts, the control signal provided to the plurality of camera modules 1100a, 1100b, and 1100c from the camera module controller 1216 may include mode information corresponding to the mode signal. The plurality of camera modules 1100a, 1100b, and 1100c may operate in a first operation mode and a second operation mode in relation to a sensing speed based on the mode information.

The plurality of camera modules 1100a, 1100b, and 1100c may generate an image signal at a first speed (e.g., an image signal of a first frame rate) and encode the image signal at a second speed higher than the first speed (e.g., an image signal of a second frame rate higher than the first frame rate), and transmit the encoded image signal to the application processor 2200, in the first operation mode. In this case, the second speed may be less than or equal to 30 times the first speed.

The application processor 2200 may store the received image signal, i.e., the encoded image signal, in the internal memory 1230 or the external memory 1400 outside the application processor 2200, and then read out and decode the encoded image signal from the internal memory 1230 or the external memory 1400, and display image data generated based on the decoded image signal. For example, a corresponding sub image processor among the plurality of sub image processors 1212a, 1212b, and 1212c of the image processing device 1210 may perform decoding, and perform image processing with respect to the decoded image signal.

The plurality of camera modules 1100a, 1100b, and 1100c may generate an image signal at a third speed that is lower than the first speed (e.g., an image signal of a third frame rate that is lower than the first frame rate) and transmit the image signal to the application processor 2200, in the second operation mode. The image signal provided to the application processor 2200 may be a non-encoded signal. The application processor 2200 may perform image processing on the received image signal or store the image signal in the internal memory 1230 or the external memory 1400.

The PMIC 1300 may supply power, e.g., a power voltage, to each of the plurality of camera modules 1100a, 1100b, and 1100c. For example, the PMIC 1300 may supply first power to the camera module 1100a through a power signal line PSLa, second power to the camera module 1100b through a power signal line PSLb, and third power to the camera module 1100c through a power signal line PSLc, under control of the application processor 2200.

The PMIC 1300 may generate power corresponding to each of the plurality of camera modules 1100a, 1100b, and 1100c and adjust a level of the power, in response to a power control signal PCON from the application processor 2200. The power control signal PCON may include a power adjustment signal for each operation mode of the plurality of camera modules 1100a, 1100b, and 1100c. For example, the operation mode may include a low power mode, and in this case, the power control signal PCON may include information about a camera module operating in the low power mode and a set power level. Levels of power respectively provided to the plurality of camera modules 1100a, 1100b, and 1100c may be the same as or different from one another. Alternatively, the level of power may be changed dynamically.

As described herein, any devices, electronic devices, modules, units, camera modules, image sensors, and/or portions thereof according to any of the example embodiments, and/or any portions thereof (including, without limitation, the image sensor 100, digital imaging device 1000, image sensor 200, imaging device 1102, processor 1200, signal processor 230, controller 220, electronic device 2100, application processor 2200, image generator 1214, image sub processors 1212a, 1212b, 1212c, camera module controller 1216, memory controller 1220, PMIC 1300, external memory 1400, internal memory 1230, image sensing device 1141, control logic 1144, image sensor 1142, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of the image sensor, including the functionality and/or methods performed by some or all of any devices, electronic devices, modules, units, camera modules, image sensors, and/or portions thereof according to any of the example embodiments, and/or any portions thereof.

Any of the memories described herein, including, without limitation, internal memory 1230, external memory 1400, memory 1146, and/or storage device 1150 may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

While the inventive concepts have been particularly shown and described with reference to some example embodiments thereof, it will be understood that various changes in form and details may be made therein without departing from the spirit and scope of the following claims.

What is claimed is:

1. An image sensor, comprising:
   a pixel array;
   a color filter array including a plurality of color filters arranged in a matrix on the pixel array, the plurality of color filters being divided into a plurality of groups, each individual group of the plurality of groups including nine color filters arranged in three rows and three columns; and
   a micro lens array on the color filter array,
   wherein each individual group of color filters includes,
      a plurality of first color filters on diagonal corners opposite each other in the each individual group of color filters, the plurality of first color filters in the each individual group of color filters being an identical color, and
      a remainder of color filters in the each individual group of color filters, the remainder of color filters of the each individual group of color filters are a plurality of second color filters, the plurality of second color filters in the each individual group of color filters includes identical color filters such that the each individual group of color filters includes two color filters of the plurality of first color filters and seven color filters of the plurality of second color filters.

2. The image sensor of claim 1, wherein each first color filter of the plurality of first color filters among the nine color filters is a white filter, and each second color filter of the plurality of second color filters among the nine color filters is a color filter that is different from the white filter.

3. The image sensor of claim 1, wherein any one first color filter of the plurality of first color filters included in the each individual group of color filters is
adjacent to any one row-adjacent first color filter of the plurality of first color filters included in a row-adjacent group of the plurality of groups, and
adjacent to any one column-adjacent first color filter of the plurality of first color filters included in a column-adjacent group of the plurality of groups.

4. The image sensor of claim 1, wherein
the plurality of groups includes
   a first group and a second group that are adjacent to each other in a row direction,
   a third group that is adjacent to the first group in a column direction, and
   a fourth group that is adjacent to the second group in the column direction,
each second color filter of the plurality of second color filters of the first group is a red filter,
each second color filter of the plurality of second color filters of the second group is a first green filter,
each second color filter of the plurality of second color filters of the third group is a second green filter, and
each second color filter of the plurality of second color filters of the fourth group is a blue filter.

5. The image sensor of claim 1, wherein
the micro lens array includes a plurality of micro lenses, and
each micro lens of the plurality of micro lenses is on a different one or more color filters of the color filter array.

6. The image sensor of claim 1, wherein the micro lens array includes a first micro lens on four adjacent first color filters among the plurality of color filters.

7. The image sensor of claim 6, wherein
the micro lens array includes a plurality of second micro lenses, and
each second micro lens of the plurality of second micro lenses is on a different second color filter of the plurality of second color filters among the plurality of color filters.

8. The image sensor of claim 6, wherein the pixel array includes four photoelectric conversion elements at least partially overlapped by the first micro lens.

9. The image sensor of claim 8, wherein each photoelectric conversion element of the four photoelectric conversion elements is configured to output a signal, at least two signals output from the four photoelectric conversion elements are output as a phase detection signal pair used for phase difference calculation.

10. The image sensor of claim 8, wherein the four photoelectric conversion elements are isolated from direct contact with each other by at least a plurality of isolation films.

11. An image sensor, comprising:
   a pixel array;
   a color filter array including a plurality of color filters arranged in a matrix on the pixel array, the plurality of color filters being divided into a plurality of groups, each group of the plurality of groups comprising a plurality of first color filters and a plurality of second color filters, the each group includes nine color filters arranged in three rows and three columns; and
   a micro lens array on the color filter array,
   wherein the micro lens array includes a first micro lens on four adjacent first color filters among the plurality of color filters and a plurality of second micro lenses, each second micro lens of the plurality of second micro lenses on a different second color filter of the plurality of second color filters, and wherein the plurality of first color filters in the each group are on opposite diagonal corners from one another, and a remainder of color filters in the each group are the plurality of second color filters in the each group including identical color filters corresponding to the each group of the plurality of groups such that the each group includes two color filters of the plurality of first color filters and seven color filters of the plurality of second color filters, each of the plurality of first color filters in the each group are identical colors.

12. The image sensor of claim 11, wherein the pixel array includes four photoelectric conversion elements at least partially overlapped by the first micro lens.

13. The image sensor of claim 12, wherein the four photoelectric conversion elements are configured to output a phase detection signal pair used for phase difference calculation in a left-right direction, the phase detection signal pair including at least one of
a first signal pair output from a first photoelectric conversion element and a third photoelectric conversion element that are in a first column, or
a second signal pair output from a second photoelectric conversion element and a fourth photoelectric conversion element that are in a second column.

14. The image sensor of claim 12, wherein the four photoelectric conversion elements are configured to output a phase detection signal pair used for phase difference calculation in an up-down direction, the phase detection signal pair including at least one of
a first signal pair output from a first photoelectric conversion element and a second photoelectric conversion element that are in a first row, or
a second signal pair output from a third photoelectric conversion element and a fourth photoelectric conversion element that are in a second row.

15. The image sensor of claim 11, wherein each first color filter in the each group is configured to selectively transmit light of a first wavelength band, and each second color filter in the each group is configured to selectively transmit light of a second wavelength band that is different from the first wavelength band.

16. The image sensor of claim 11, wherein
the plurality of groups includes
a first group and a second group that are adjacent to each other in a row direction,
a third group that is adjacent to the first group in a column direction, and
a fourth group that is adjacent to the second group in the column direction,
each second color filter of the first group is a red filter,
each second color filter of the second group is a first green filter,
each second color filter of the third group is a second green filter, and
each second color filter of the fourth group is a blue filter.

17. A camera device, comprising:
an image sensor, wherein the image sensor includes a pixel array further including a plurality of pixels arranged in a matrix,
wherein the plurality of pixels are divided into a plurality of groups, each group of the plurality of groups includes a plurality of first pixels and a plurality of second pixels,
wherein the each group of the plurality of groups includes nine color filters arranged in three rows and three columns,
wherein the each group of the plurality of groups includes,
a plurality of first color filters corresponding to first pixels in the each group, the plurality of first color filters on diagonal corners opposite each other in the each group, each of the plurality of first color filters in the each group being an identical color, and
a remainder of color filters in the each group, the remainder of color filters in the each group are a plurality of second color filters corresponding to second pixels in the each group, the plurality of second color filters in the each group are identical color filters corresponding to the each group such that the each group includes two color filters of the plurality of first color filters and seven color filters of the plurality of second color filters; and
wherein the plurality of first color filters are white color filters such that the image sensor includes white color filters on four adjacent first pixels among the plurality of pixels.

18. The camera device of claim 17, wherein
the camera device is configured to operate in a first operation mode,
the image sensor is configured to output a first pixel signal from the four adjacent first pixels and a plurality of second pixel signals from the plurality of second pixels based on the camera device operating in the first operation mode,
the first pixel signal is a sum of a plurality of first signals, each first signal of the plurality of first signals is output by a corresponding first pixel of the four adjacent first pixels, and
each second pixel signal of the plurality of second pixel signals is based on a plurality of second signals, each second signal of the plurality of second signals is output by a corresponding second pixel of the plurality of second pixels, each second pixel signal is a sum of each second signal of the plurality of second signals corresponding to the each group of the plurality of groups.

19. The camera device of claim 17, further comprising:
a processor,
wherein the image sensor is configured to output at least two pixel signals among a plurality of pixel signals, the at least two pixel signals output from the four adjacent first pixels as a phase detection signal pair used for phase difference calculation, and
the processor is configured to generate depth information of a subject based on the phase detection signal pair.

20. The camera device of claim 17, wherein the four adjacent first pixels share a common photodiode such that a photocharge generated by a photodiode in each first pixel of the four adjacent first pixels is accumulated in the common photodiode.

* * * * *